(12) United States Patent
Minato et al.

(10) Patent No.: US 8,535,154 B2
(45) Date of Patent: Sep. 17, 2013

(54) INFORMATION STORAGE MEDIUM AND IMAGE GENERATION DEVICE

(75) Inventors: Kazuhisa Minato, Yokohama (JP); Motonaga Ishii, Yokohama (JP); Shinobu Nimura, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 41 days.

(21) Appl. No.: 13/224,897

(22) Filed: Sep. 2, 2011

(65) Prior Publication Data

US 2012/0058823 A1 Mar. 8, 2012

(30) Foreign Application Priority Data

Sep. 8, 2010 (JP) ................................ 2010-201484

(51) Int. Cl.
*A63F 13/00* (2006.01)
(52) U.S. Cl.
USPC .......... 463/32; 463/1; 463/7; 463/30; 463/31; 463/33; 345/156; 345/420; 345/665

(58) Field of Classification Search
USPC .................... 345/156, 285, 420, 665; 463/1, 463/2, 9, 30–34, 7
See application file for complete search history.

(56) References Cited

U.S. PATENT DOCUMENTS

2011/0169866 A1* 7/2011 Yoshikawa et al. ........... 345/660

FOREIGN PATENT DOCUMENTS

JP          A-11-259686          9/1999

* cited by examiner

*Primary Examiner* — Sunit Pandya
(74) *Attorney, Agent, or Firm* — Oliff & Berridge, PLC

(57) ABSTRACT

An image generation device includes a capture direction specifying section, a capture target specifying section, a marker placement control section that disposes a marker at the capture point, and an image generation section, the capture target specifying section determining whether or not the capture target is present in the capture direction, and specifying the capture target when the capture target is present, and the marker placement control section performing a depth value correction process that corrects the depth value of the capture point when a transition has occurred from a state in which the capture target is present to a state in which the capture target is not present.

24 Claims, 25 Drawing Sheets

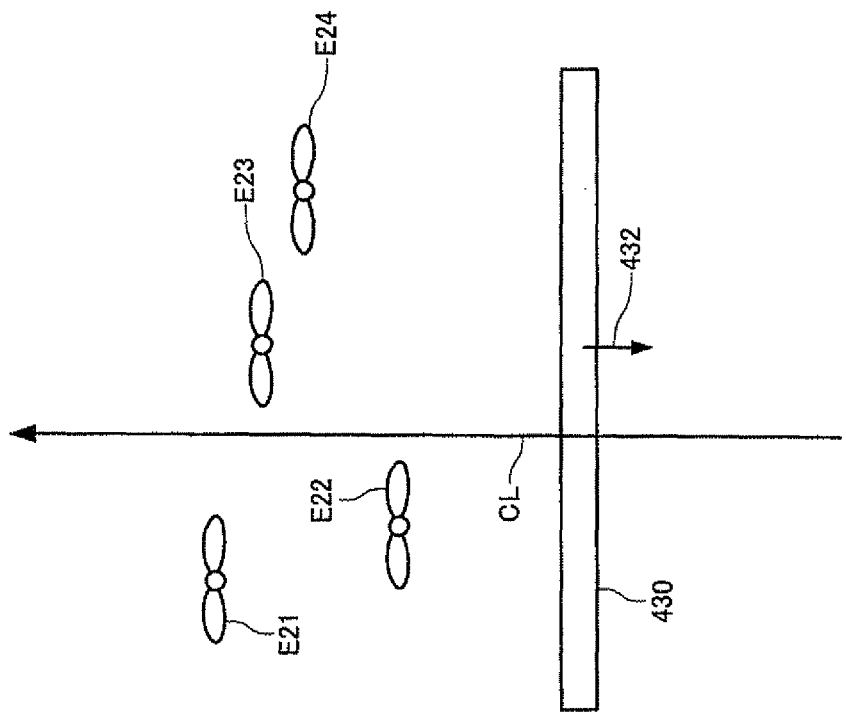
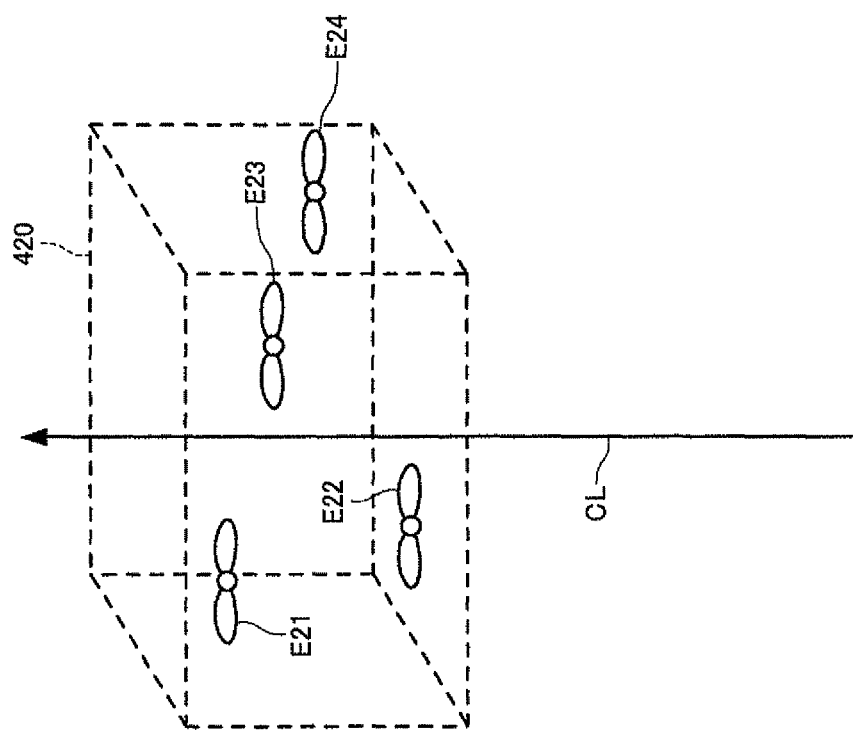

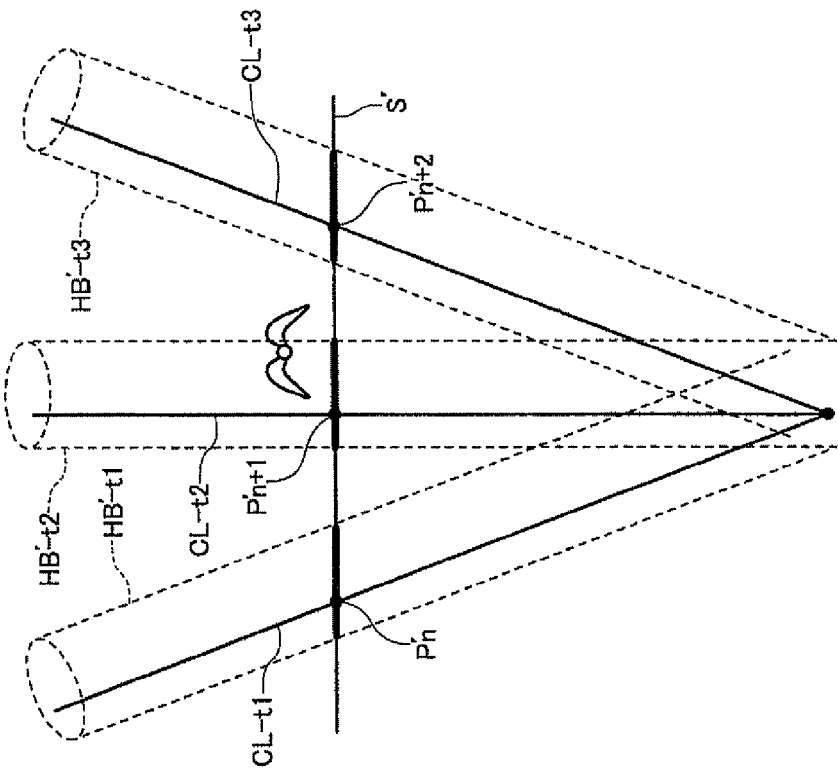
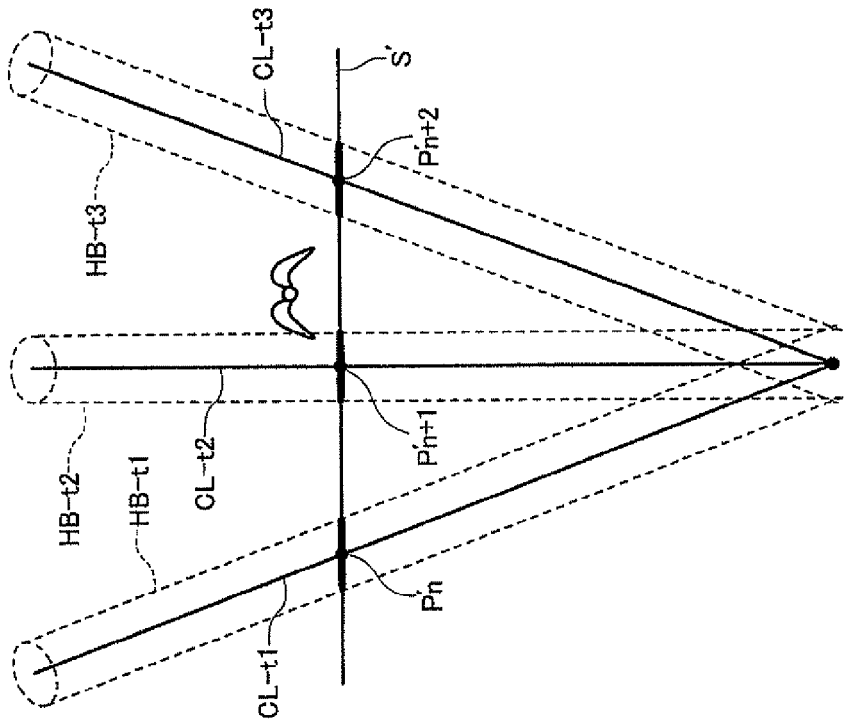

| OBJECT | (R, G, B, A) | ID | PART | HIT TYPE |
|---|---|---|---|---|
| ENEMY OBJECT OB1 (HEAD) | (1, 1, 1, 1) | 1 | 1 | 1 |
| ENEMY OBJECT OB1 (TRUNK) | (1, 1, 2, 1) | 1 | 2 | 1 |
| ENEMY OBJECT OB1 (ARM) | (1, 1, 3, 1) | 1 | 3 | 1 |
| ENEMY OBJECT OB1 (LEG) | (1, 1, 4, 1) | 1 | 4 | 1 |
| ENEMY OBJECT OB2 (HEAD) | (1, 2, 1, 1) | 2 | 1 | 1 |
| BACKGROUND BK1 | (2, 1, 0, 2) | 10 |  | 2 |
| BOX TOB1 | (3, 1, 0, 3) | 20 |  | 3 |
| BOX 2 TOB2 | (3, 2, 0, 3) | 21 |  | 3 |
| ⋮ | ⋮ | ⋮ | ⋮ | ⋮ |

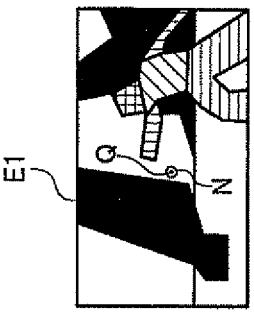
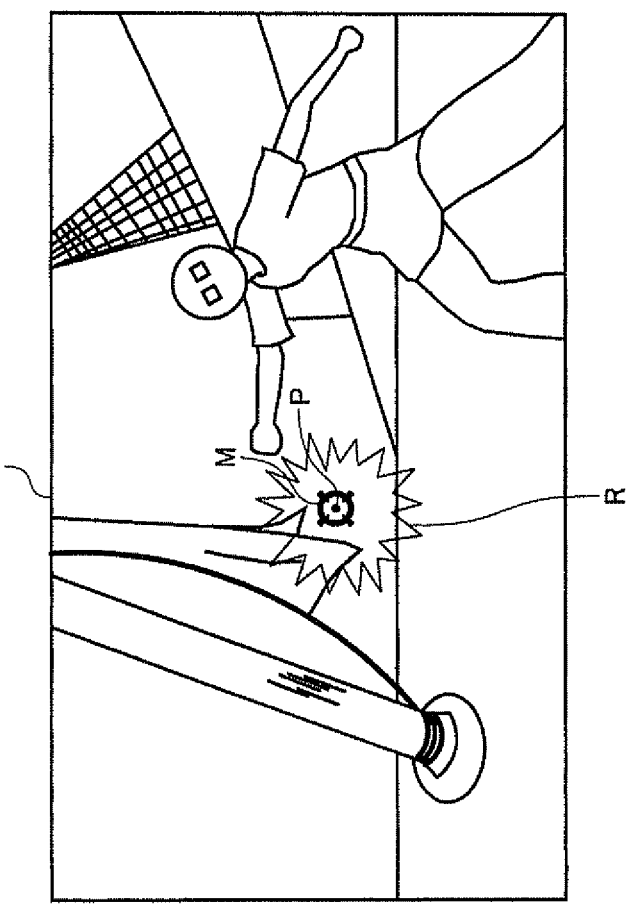
FIG.30B
FIG.30A

INFORMATION STORAGE MEDIUM AND IMAGE GENERATION DEVICE

Japanese Patent Application No. 2010-201484, filed on Sep. 8, 2010, is hereby incorporated by reference in its entirety.

BACKGROUND OF THE INVENTION

The present invention relates to an information storage medium and an image generation device.

An image generation device (game system) that generates an image viewed from a virtual camera (given viewpoint) within an object space (virtual three-dimensional space) where an object (e.g., character) is disposed has been known, and is very popular as a means that allows the player to experience virtual reality.

For example, a related-art image generation device generates an image of a shooting game that allows the player to fire a bullet at an enemy character in an object space (three-dimensional space) using an input section.

JP-A-11-259686 disclose related-art technology.

Such a shooting game requires a reticle that allows the player to aim at a target object. A related-art shooting game is generally configured so that the reticle is disposed in a two-dimensional layer for displaying the score, ranking, and the like. In this case, an image obtained by superimposing an image projected onto a screen (projection plane) by perspective transformation and an image of a two-dimensional layer (in which the reticle and the like are disposed) is displayed (presented to the player).

However, the player may not be able to accurately determine the hit position when using the reticle disposed on a two-dimensional layer. In particular, the difference between the reticle position and the hit position may increase when the distance between the viewpoint and the hit position is long. Moreover, the operation of the shooting device and the movement of the reticle cannot be sufficiently synchronized when using the reticle disposed in a two-dimensional layer.

When implementing a shooting game that displays a stereoscopic image, the player may not be able to determine the hit position when using the reticle disposed on a two-dimensional layer, and the stereoscopic image may be impaired due to the two-dimensionally displayed reticle.

The inventors of the present application have been developing a shooting game that disposes a reticle within a virtual three-dimensional space, and moves a reticle corresponding to an operation performed by the player in order to enable accurate shooting. In such a shooting game, when a target object or a background object is present at the position of the reticle, the observability (visibility) is improved by displaying the reticle at (or on the front side of) the position of the object in the depth direction. When implementing a battle scene in which a number of target objects appear on the display screen, however, the target object disappears when the target object has been shot, and the reticle suddenly moves backward within the game space. This makes it difficult for the player to determine the reticle position.

SUMMARY

According to a first aspect of the invention, there is provided a non-transitory computer-readable information storage medium storing a program that generates an image of a virtual three-dimensional space, the program causing a computer to function as:

a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point; and an image generation section that generates an image of the virtual three-dimensional space viewed from a virtual camera, objects including the marker being disposed in the virtual three-dimensional space, the capture target specifying section determining whether or not the capture target is present in the capture direction within the virtual three-dimensional space, and specifying the capture target when the capture target is present, and the marker placement control section determining the depth value of the capture point based on a depth value corresponding to the capture target when the capture target is present, setting a depth value of a drawn object that is positioned furthest from the virtual camera in the capture direction, or a predetermined depth value, as the depth value of the capture point when the capture target is not present, and performing a depth value correction process that corrects the depth value of the capture point when a transition has occurred from a state in which the capture target is present to a state in which the capture target is not present.

According to a second aspect of the invention, there is provided a non-transitory computer-readable information storage medium storing a program that generates an image of a virtual three-dimensional space, the program causing a computer to function as:

a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point; and an image generation section that generates an image of the virtual three-dimensional space viewed from a virtual camera, objects including the marker being disposed in the virtual three-dimensional space, the capture target specifying section predicting a change in the capture direction based on a change history of the capture direction, and specifying the capture target taking account of the predicted change in the capture direction, and the marker placement control section determining the depth value of the capture point based on a depth value corresponding to the capture target when the capture target is present, and disposing the marker at a position in the capture direction corresponding to the determined depth value.

According to a third aspect of the invention, there is provided a non-transitory computer-readable information storage medium storing a program that generates an image of a virtual three-dimensional space, the program causing a computer to function as:

a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point; and an image generation section that generates an image of the virtual three-dimensional space viewed from a virtual camera, objects including the marker being disposed in the virtual three-dimensional space, the capture target specifying section grouping a plurality of objects, and detecting an object group present in the capture direction, and the marker placement control section determining the depth value of the capture point based on a depth value corresponding to a capture target object group when the capture target object group has been detected.

According to a fourth aspect of the invention, there is provided an image generation device that generates an image of a virtual three-dimensional space, the image generation device including:

a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point; and an image generation section that generates an image of the virtual three-dimensional space viewed from a virtual camera, objects including the marker being disposed in the virtual three-dimensional space, the capture target specifying section determining whether or not the capture target is present in the capture direction within the virtual three-dimensional space, and specifying the capture target when the capture target is present, and the marker placement control section determining the depth value of the capture point based on a depth value corresponding to the capture target when the capture target is present, setting a depth value of a drawn object that is positioned furthest from the virtual camera in the capture direction, or a predetermined depth value, as the depth value of the capture point when the capture target is not present, and performing a depth value correction process that corrects the depth value of the capture point when a transition has occurred from a state in which the capture target is present to a state in which the capture target is not present.

BRIEF DESCRIPTION OF THE SEVERAL VIEWS OF THE DRAWING

FIGS. 18A and 18B illustrate a capture determination process that is performed corresponding to each object group.

FIGS. 20A and 20B three-dimensionally illustrate the situation in FIGS. 19A and 19B within a virtual three-dimensional space.

FIGS. 30A and 30B illustrate an indication position acquisition method.

DETAILED DESCRIPTION OF THE EMBODIMENT

Figure 1:
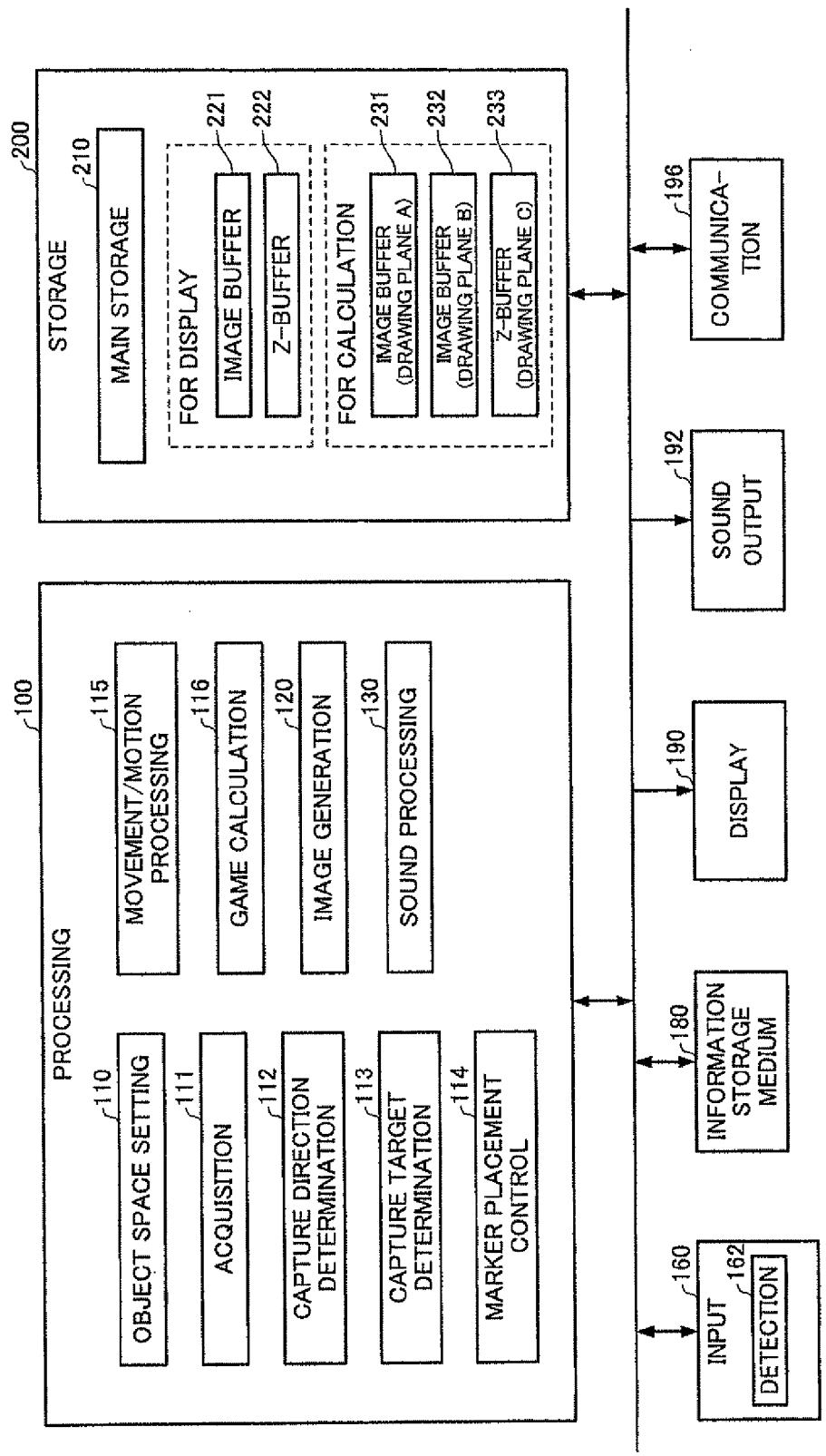
FIG. 1 is an example of a functional block diagram of an image generation device according to one embodiment of the invention.

The invention may provide an information storage medium and an image generation device that allow the player (user) to easily determine the positional relationship with an object disposed within a virtual three-dimensional space, and can display a mark with good visibility and operability.

(1) One embodiment of the invention relates to a non-transitory computer-readable information storage medium storing a program that generates an image of a virtual three-dimensional space, the program causing a computer to function as:

a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point; and an image generation section that generates an image of the virtual three-dimensional space viewed from a virtual camera, objects including the marker being disposed in the virtual three-dimensional space, the capture target specifying section determining whether or not the capture target is present in the capture direction within the virtual three-dimensional space, and specifying the capture target when the capture target is present, and the marker placement control section determining the depth value of the capture point based on a depth value corresponding to the capture target when the capture target is present, setting a depth value of a drawn object that is positioned furthest from the virtual camera in the capture direction, or a predetermined depth value, as the depth value of the capture point when the capture target is not present, and performing a depth value correction process that corrects the depth value of the capture point when a transition has occurred from a state in which the capture target is present to a state in which the capture target is not present.

Another embodiment of the invention relates to an image generation device that includes the above components.

The term "capture point" used herein refers to a point within the virtual three-dimensional space that is aimed at by the player. When implementing a shooting game or the like, the capture point may be a point aimed at by a shooting device, or may be a reticle position.

The term "capture direction" refers to a direction in which the player aims at the target in the virtual three-dimensional space, and may be indicated by a straight line (capture line) disposed within the virtual three-dimensional space. When implementing a shooting game or the like, the capture direction may be a direction in which a shooting device aims at the target, or may be a direction of the reticle position.

The term "capture target specifying result" includes a specifying result for the presence or absence of the capture target and a specifying result for the capture target when the capture target is present.

The program may be a program that generates an image of a shooting game. The generated image may be a two-dimensional image (i.e., an image obtained by projecting a three-dimensional space onto a plane) or a three-dimensional image (i.e., stereoscopic image).

The input information may be an operation signal detected by an input device (e.g., shooting device or pointing device) or an operation section. The input information may be information that makes it possible to acquire the indication position within an image displayed on the screen (e.g., tilt information about the input device, or capture information about a camera for determining the indication position indicated by the input device).

When using a first-person viewpoint, the capture direction may be a direction (straight line) that connects the virtual camera and a point within the virtual three-dimensional space corresponding to a point indicated by the player (e.g., a point within the virtual three-dimensional space corresponding to the indication position within the image displayed on the screen).

When using a third-person viewpoint, the capture direction may be a direction (straight line) that connects a point within the virtual three-dimensional space corresponding to a point indicated by the player (e.g., a point within the virtual three-dimensional space corresponding to the indication position within the image displayed on the screen) and a player character within the virtual three-dimensional space or a shooting device held by the player character.

The object disposed within the virtual three-dimensional space may be either a moving object or stationary object. The object may also be a target object (i.e., an object that is subjected to a hit (shooting) determination process).

When a plurality of objects are present in the capture direction, the capture target specifying section may give priority to an object that has a depth value close to that of the virtual camera.

The marker placement control section may set the depth value of the capture point at the position of the capture target object or on the front side of the position of the capture target object.

The capture target specifying section may detect the capture target object by performing intersection determination (hit check) on a ray set based on the capture direction and the object within the virtual three-dimensional space, or may generate a determination image, and detect the capture target object based on pixel information about the capture position (i.e., the indication position within an image displayed on a screen determined based on the input information).

The Z-value of the capture point within the virtual three-dimensional space is determined based on the depth value corresponding to the capture target, and the X-value and the Y-value are the X-coordinate value and the Y-coordinate value of the intersection point of the capture direction (line) and a plane defined by the determined depth value.

Note that the depth value corresponding to the capture target may be the depth value of the capture target object, or may be the depth value corresponding to the object group including the capture target object.

When the capture target object is not present, the depth value of a drawn object (e.g., background) that is positioned furthest from the virtual camera in the capture direction, or a predetermined depth value, may be set as the depth value of the capture point.

The marker disposed at the capture point may be a reticle object that indicates the reticle position, for example. The reticle object may be formed by a polygon plate or the like, and the direction of the reticle object may be set corresponding to the line-of-sight direction.

The expression "a transition has occurred from a state in which the capture target is present to a state in which the capture target is not present" refers to a case where a transition to a state in which the capture target is not present has occurred due to a change in the capture direction, or the movement or disappearance of the object, for example.

A process that does not change the depth value for a predetermined period, a process that limits an amount of change in the depth value of the capture point, and a process that corrects the depth value of the capture point so that the depth value of the capture point does not instantaneously change to the depth value of the drawn object that is positioned furthest from the virtual camera (e.g., a process that delays a time until the depth value of the drawn object that is positioned furthest from the virtual camera or a predetermined depth value is reached, a process that limits the maximum moving distance in the depth direction, a process that delays the change speed of the capture point in the depth direction, or a control process that differs from the capture point depth value control process when the capture target is present) may be performed.

The depth value of the capture point may be controlled when the capture target is present by changing the depth value either instantaneously or after a predetermined time corresponding to the depth value of the capture target object. In this case, the change speed of the capture point (or the moving speed of the marker) is determined by the distance between the capture point before the movement and the capture point after the movement. When correcting the depth value of the capture point, the depth value of the capture point may be changed at a speed lower than the speed determined by the distance between the capture point before the movement and the capture point after the movement.

According to the above configuration, since the marker is disposed within the virtual three-dimensional space, the player can accurately determine the indication position (hit position) within the virtual three-dimensional space. When the marker is merely disposed within the virtual three-dimensional space, the capture target may be lost (i.e., a transition may occur from a state in which the capture target is present to a state in which the capture target is not present), so that the movement of the marker in the depth direction may become complex, and an inconvenient image may be generated. According to the above configuration, however, since a rapid backward movement of the marker can be prevented by correcting the depth position of the capture point when a transition has occurred from a state in which the capture target is present to a state in which the capture target is not present, a mark with good visibility and operability can be displayed.

(2) In each of the above information storage medium and the above image generation device, the marker placement control section may perform at least one of a process that does not change the depth value of the capture point for a predetermined period, a process that limits an amount of change in the depth value of the capture point, and a process that corrects the depth value of the capture point so that the depth value of the capture point does not instantaneously change to the depth value of the drawn object that is positioned furthest from the virtual camera, or the predetermined depth value, as the depth value correction process.

The process that corrects the depth value of the capture point so that the depth value of the capture point does not instantaneously change to the depth value of the drawn object that is positioned furthest from the virtual camera, or the predetermined depth value may be a process that delays a time until the depth value of the drawn object that is positioned furthest from the virtual camera, or the predetermined depth value, is reached, a process that reduces the maximum moving distance of the depth value in the depth direction, or a process that reduces the depth value change speed, for example.

The process that limits the amount of change in the depth value of the capture point may be implemented by a control process that reduces the degree of change in the depth value of the capture point as compared with that employed during a normal control process, or a control process that reduces the change speed in the depth direction as compared with that employed during a normal control process, as a normal control process that controls the depth value of the capture point when the capture target is present, for example.

(3) In each of the above information storage medium and the above image generation device, the marker placement control section may set the depth value of the capture point so that a moving speed of the marker disposed at the capture point increases with time when a transition has occurred from a state in which the capture target is present to a state in which the capture target is not present.

(4) In each of the above information storage medium and the above image generation device, the marker placement control section may change a depth value setting condition based on a type, size, or disposition state of the objects disposed within the virtual three-dimensional space, a predetermined parameter, or a given condition.

The disposition state of the objects disposed within the virtual three-dimensional space includes the number, density, distribution, and the like of the objects. The predetermined parameter may be a parameter relating to the number of enemy objects, difficulty level, hit score, strength, stage, and the like. The depth value setting condition includes the time (number of frames) in which the depth value is corrected (e.g., the time in which the depth value is not changed), and the amount of change in the depth value.

The depth value of the capture point may be corrected so that the moving speed of the marker in the depth direction increases as the size of the capture target object or the object present in the capture direction increases.

The depth value of the capture point may be corrected so that the moving speed of the marker in the depth direction increases as the number of objects positioned within a predetermined range of the current capture target object increases.

The depth value of the capture point may be corrected so that the moving speed of the marker in the depth direction decreases, or the period in which the depth value of the marker is fixed increases, as the number of enemy objects present within the virtual three-dimensional space increases. The depth value of the capture point may be corrected so that the moving speed of the marker decreases, or the period in which the depth value of the marker is fixed increases, as the hit score of a shooting game decreases.

The moving speed of the marker or the period in which the depth value of the marker may be changed corresponding to the game tempo, the level of the user, the difficulty level, the stage, the duration from the start of the game, or the like.

(5) In each of the information storage medium and the above image generation device, the capture target specifying section may predict a change in the capture direction based on a change history of the capture direction, and may specify the capture target taking account of the predicted change in the capture direction.

(6) Another embodiment of the invention relates to a non-transitory computer-readable information storage medium storing a program that generates an image of a virtual three-dimensional space, the program causing a computer to function as:

a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point; and an image generation section that generates an image of the virtual three-dimensional space viewed from a virtual camera, objects including the marker being disposed in the virtual three-dimensional space, the capture target specifying section predicting a change in the capture direction based on a change history of the capture direction, and specifying the capture target taking account of the predicted change in the capture direction, and the marker placement control section determining the depth value of the capture point based on a depth value corresponding to the capture target when the capture target is present, and disposing the marker at a position in the capture direction corresponding to the determined depth value.

Another embodiment of the invention relates to an image generation device that includes the above sections.

(7) In each of the above information storage medium and the above image generation device, the capture target specifying section may detect an object present in the capture direction as a capture target detection process, and the marker placement control section may determine the depth value of the capture point based on a depth value corresponding to a capture target object when the capture target object has been detected.

(8) In each of the above information storage medium and the above image generation device, the capture target specifying section may group a plurality of objects, and may detect an object group present in the capture direction as the capture target detection process, and the marker placement control section may determine the depth value of the capture point based on a depth value corresponding to a capture target object group when the capture target object group has been detected.

(9) Another embodiment of the invention relates to a non-transitory computer-readable information storage medium storing a program that generates an image of a virtual three-dimensional space, the program causing a computer to function as a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point; and an image generation section that generates an image of the virtual three-dimensional space viewed from a virtual camera, objects including the marker being disposed in the virtual three-dimensional space, the capture target specifying section grouping a plurality of objects, and detecting an object group present in the capture direction as a capture target detection process, and the marker placement control section determining the depth value of the capture point based on a depth value corresponding to a capture target object group when the capture target object group has been detected.

Another embodiment of the invention relates to an image generation device that includes the above components.

(10) In each of the above information storage medium and the above image generation device, the capture target specifying section may set a first hit check plane or a first hit check volume to an object or an object group disposed within the virtual three-dimensional space, may perform a hit check based on the first hit check plane or the first hit check volume and the capture direction, and may determine a capture target object based on a hit check result.

(11) In each of the above information storage medium and the above image generation device, the capture target specifying section may detect the capture target present in the capture direction by using a direction that connects the capture point and the virtual camera positioned in part of a controller as the capture direction.

(12) In each of the above information storage medium and the above image generation device, the image of the virtual three-dimensional space may be a stereoscopic image.

(13) In each of the above information storage medium and the above image generation device, the image generation section may perform a process that generates a first image (right-eye image) of the virtual three-dimensional space including the marker viewed from a first virtual camera (right-eye virtual camera), and a process that generates a second image (left-eye image) of the virtual three-dimensional space including the marker viewed from a second virtual camera (left-eye virtual camera), and may generate a stereoscopic image based on the first image (right-eye image) and the second image (left-eye image).

(14) In each of the above information storage medium and the above image generation device, the capture target specifying section may detect the capture target present in the capture direction by using a direction that connects the capture point and the virtual camera set at a position suitable for observing the stereoscopic image as the capture direction.

(15) In each of the above information storage medium and the above image generation device, the capture target specifying section may detect the capture target present in the capture direction (capture line) by using a direction that connects the capture point and a third virtual camera (center camera) disposed at a midpoint between the first virtual camera (left-eye camera) and the second virtual camera (right-eye camera) as the capture direction (capture line).

Exemplary embodiments of the invention are described below. Note that the following embodiments do not unduly limit the scope of the invention as stated in the claims. Note also that all of the elements described below should not necessarily be taken as essential elements of the invention.

1. Configuration

FIG. 1 illustrates an example of a functional block diagram of an image generation device (computer, terminal, or game machine) according to one embodiment of the invention. Note that the image generation system may have a configuration in which some of the elements (sections) illustrated in FIG. 1 are omitted.

An input section 160 allows the player to input information, and outputs the input information input by the player to a processing section. The input section 160 includes a detection section 162 that detects the input information (input signal) input by the player. The input section 160 may be implemented by a lever, a button, a steering wheel, a microphone, a touch panel display, or the like. The input section 160 may include a vibration section that vibrates based on a predetermined vibration signal.

The input section 160 may be an input device that includes an acceleration sensor that detects three-axis accelerations, a gyrosensor that detects angular velocity, and an imaging section. For example, the input device may be operated by the player in a state in which the input device is held or worn by the player. The term "input device" used herein includes a controller that imitates a tool such as a sword-type controller or a gun-type controller that is held by the player, or a glove-type controller that is worn by the player. The term "input device" used herein also includes an image generation device, a portable image generation device, a mobile phone, or the like that is integrated with the input device.

The detection section 162 detects the input information that has been input using the input section 160. For example, the detection section 162 may detect an input signal generated when the player has pulled a trigger of the input section 160 as the input information (attack input information). The detection section 162 may also detect the input information (instruction input information) that has been input using the input section 160 and indicates (instructs) the position of a reticle, for example.

For example, when the input section 160 is a touch panel display produced by stacking a liquid crystal display and a touch panel for detecting the touch position of the player, the input section 160 may detect touch position information about an input device (e.g., touch pen) or a fingertip as the input information.

When the input section 160 is an input device that includes an imaging section, the input section 160 may detect indication position information about a captured image as the input information. More specifically, the imaging section includes an infrared filter, a lens, an imaging element (image sensor), and an image processing circuit. The infrared filter is disposed on the front side of the input device, and allows only infrared radiation contained in light incident from a light source (two light sources) disposed corresponding to the display section 190 to pass through. The lens condenses the infrared radiation that has passed through the infrared filter, and emits the focused infrared radiation to the imaging element. The imaging element is a solid-state imaging element such as a CMOS sensor or a CCD. The imaging element captures the infrared radiation condensed by the lens to generate a captured image. The captured image generated by the imaging element is processed by the image processing circuit. For example, the input device that includes the imaging section may process the captured image generated by the imaging device to detect a high-luminance component, and may detect light source position information (indication position information) within the captured image as the input information.

A storage section 200 serves as a work area for a processing section 100, a communication section 196, and the like. The function of the storage section 200 may be implemented by a RAM, a VRAM, or the like.

The storage section 200 may include an image buffer that stores an image, and a Z-buffer that stores a depth value (Z-value) of each pixel of an image. An image buffer 221 stores (R, G, B, A) values (RGB color values and alpha-value (A-value)) of each pixel of a display image. Specifically, the image buffer 221 stores color information (R, G, B) and translucency information (alpha-value (A-value)) about each pixel of the display image. A Z-buffer 222 stores the depth value of each pixel that is drawn in the image buffer 221.

An image buffer 231 (drawing plane A) may store the (R, G, B, A) values of each pixel of a calculation image. The image buffer 231 stores the (R, G, B, A) values of the calculation image that indicate information (e.g., ID (hit ID), part, and hit type) about an object. An image buffer 232 (drawing plane B) may store the (R, G, B, A) values of each pixel of the calculation image. The image buffer 232 stores the (R, G, B, A) values of the calculation image that indicate the normal vector and attribute information (e.g., the material of an object). A Z-buffer 233 (drawing plane C) stores the depth value of each pixel that is drawn in the image buffers 231 and 232. Note that the images buffers 231 and 232 and the Z-buffer 233 (reduction buffers) may have a size equal to 1/nth of the size of the image buffer 221 and the Z-buffer 222.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 performs various processes according to one embodiment of the invention based on a program (data) stored in the information storage medium 180. A program that causes a computer to function as each section according to one embodiment of the invention (i.e., a program that causes a computer to execute the process of each section) may be stored in the information storage medium 180.

A display section 190 outputs an image generated according to one embodiment of the invention. The function of the display section 190 may be implemented by a CRT, an LCD, a touch panel display, a head mount display (HMD), or the like. A sound output section 192 outputs sound generated according to one embodiment of the invention. The function of the sound output section 192 may be implemented by a speaker, a headphone, or the like.

The communication section 196 controls communication with the outside (e.g., another image generation device). The function of the communication section 196 may be implemented by hardware such as a processor or a communication ASIC, a program, or the like.

Note that the image generation device may receive a program (data) that causes a computer to function as each section according to one embodiment of the invention from an information storage medium or a storage section included in a server via a network, and may store the program (data) in the information storage medium 180 or the storage section 200. A case where the image generation device is operated based on a program (data) received from the server is also included within the scope of the invention.

The processing section 100 (processor) performs a game process, an image generation process, a sound generation process, and the like based on the input information input using the input section 160, a program, and the like.

The processing section 100 performs various processes using a main storage section 210 included in the storage section 200 as a work area. The function of the processing section 100 may be implemented by hardware such as a processor (e.g., CPU, GPU, or DSP) or an ASIC (e.g., gate array), or may be implemented by a program.

The processing section 100 includes an object space setting section 110, an acquisition section 111, a capture direction specifying section 112, a capture target specifying section 113, a marker placement control section 114, a movement/motion processing section 115, a game calculation section 116, an image generation section (drawing section) 120, and a sound processing section 130. Note that the processing section 100 may have a configuration in which some of these sections are omitted.

The object space setting section 110 disposes a display object (e.g., character (enemy object), building, stadium, car, tree, pillar, wall, or map (topography)) in an object space.

The term "object space" used herein refers to a virtual three-dimensional space. The term "three-dimensional space" used herein refers to a space in which an object is disposed at three-dimensional coordinates (X, Y, Z), for example.

For example, the object space setting section 110 disposes an object (i.e., an object formed by a primitive such as a polygon, a free-form surface, or a subdivision surface) in a world coordinate system when the object space is a three-dimensional space. The object space setting section 110 determines the position and the rotation angle (synonymous with orientation or direction) of the object in the world coordinate system, and disposes the object at the determined position (X, Y, Z) and the determined rotation angle (rotation angles around the X, Y, and Z-axes).

The acquisition section 111 acquires an indication position (cursor position) within an image (calculation image) based on the input information input using the input section 160. For example, the acquisition section 111 may acquire an indication position within a display image based on the input information input using the input section 160. For example, the acquisition section 111 acquires the indication position detected by the input section 160 as an indication position within an image (calculation image).

The capture direction specifying section 112 specifies a capture direction in which a capture point is disposed within the virtual three-dimensional space based on the input information, the capture target specifying section 113 specifies a capture target within the virtual three-dimensional space based on the capture direction, and the marker placement control section 114 sets the depth value of the capture point based on the capture target specifying result, and disposes a marker at the capture point.

The capture target specifying section 113 determines whether or not the capture target is present in the capture direction within the virtual three-dimensional space, and specifies the capture target when the capture target is present. The marker placement control section 114 determines the depth value of the capture point based on the depth value corresponding to the capture target when the capture target is present, sets the depth value of a drawn object that is furthest from the virtual camera in the capture direction, or a predetermined depth value, as the depth value of the capture point when the capture target is not present, and performs a depth value correction process that corrects the depth value of the capture point when a transition has occurred from a state in which the capture target is present to a state in which the capture target is not present.

The marker placement control section 114 may perform at least one of a process that does not change the depth value of the capture point for a predetermined period, a process that limits the amount of change in the depth value of the capture point, and a process that corrects the depth value of the capture point so that the depth value of the capture point does not instantaneously change to the depth value of a drawn object that is positioned furthest from the virtual camera, or a predetermined depth value, as the depth value correction process.

The marker placement control section 114 may set the depth value of the capture point so that the moving speed of the marker disposed at the capture point increases with time when a transition has occurred from a state in which the capture target is present to a state in which the capture target is not present.

The marker placement control section 114 may change a depth value setting condition based on the type, size, or disposition state of the objects disposed within the virtual three-dimensional space, a predetermined parameter, or a given condition.

The capture target specifying section 113 may predict a change in the capture direction based on the change history of the capture direction, and may specify the capture target taking account of the predicted change in the capture direction.

The capture target specifying section 113 may detect an object present in the capture direction as the capture target detection process, and the marker placement control section 114 may determine the depth value of the capture point based on the depth value corresponding to a capture target object when the capture target object has been detected.

The capture target specifying section 113 may group a plurality of objects, and may detect an object group present in the capture direction as the capture target detection process, and the marker placement control section 114 may determine the depth value of the capture point based on the depth value corresponding to a capture target object group when the capture target object group has been detected.

The capture target specifying section 113 may set a first hit check plane or a first hit check volume to an object or an object group disposed within the virtual three-dimensional space, may perform a hit check based on the first hit check plane or the first hit check volume and the capture direction, and may determine the capture target object based on the hit check result.

The game calculation section 116 performs various game processes. For example, the game calculation section 116 starts the game when game start conditions have been satisfied, proceeds with the game, finishes the game when game finish conditions have been satisfied, and performs an ending process when the final stage has been cleared, for example.

The game calculation section 116 determines whether or not a given parameter (strength value) of the player character has reached a predetermined value (0), and determines that the game has ended when the given parameter (strength value) of the player character has reached the predetermined value (0).

The image generation section 120 performs a drawing process based on the results of various processes performed by the processing section 100 to generate an image, and outputs the generated image to the display section 190. The image generated by the image generation section 120 may be either a two-dimensional image or a three-dimensional image (stereoscopic image).

When generating a three-dimensional game image, the image generation section 120 receives object data (model data) including vertex data (e.g., vertex position coordinates, texture coordinates, color data, normal vector, or alpha value) about each vertex of the object (model), and performs a vertex process (shading using a vertex shader) based on the vertex data included in the received object data. When performing the vertex process, the image generation section 120 may perform a vertex generation process (tessellation, surface division, or polygon division) for dividing the polygon, if necessary.

In the vertex process, the image generation section 120 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results.

The image generation section 120 then performs a rasterization process (scan conversion) based on the vertex data changed by the vertex process so that the surface of the polygon (primitive) is linked to pixels. The image generation section 120 then performs a pixel process (shading using a pixel shader or a fragment process) that draws the pixels that form the image (fragments that form the display screen). In the pixel process, the image generation section 120 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to a drawing buffer (i.e., a buffer that can store image information corresponding to each pixel; VRAM or rendering target). Specifically, the pixel process includes a per-pixel process that sets or changes pixel data or voxel data (e.g., color (RGB), alpha-value, Z-value, and luminance) in pixel units. The image generation section 120 thus generates an image viewed from the virtual camera (given viewpoint) in the object space. When a plurality of virtual cameras (viewpoints) are provided, the image generation section 120 may generate images viewed from the respective virtual cameras.

The image generation section 120 controls the virtual camera (view point) for generating an image viewed from a given (arbitrary) viewpoint in the object space. Specifically, the image generation section 120 controls the position (X, Y, Z) or the rotational angle (e.g., the rotational angle of the virtual camera when the virtual camera is rotated clockwise around each of the X, Y, and Z axes) of the virtual camera in the world coordinate system when generating a three-dimensional image. More specifically, the image generation section 120 controls the viewpoint position, the line-of-sight direction, and the angle of view of the virtual camera. The image generation section 120 may rotate the virtual camera by a predetermined rotation angle. In this case, the image generation section 120 controls the virtual camera based on virtual camera data that specifies the position or the rotational angle of the virtual camera. When a plurality of virtual cameras (viewpoints) are provided, the image generation section 120 performs the above control process on each virtual camera.

For example, the image generation section 120 may generate an image based on the viewpoint (first-person viewpoint) of the player character (i.e., first-person shooter game), or may generate an image based on the viewpoint (third-person viewpoint) of a third-person (i.e., third-person shooter game). The movement, the direction, and the angle of view of the virtual camera may be controlled based on a program, or may be controlled based on the input information input using the input section 160.

For example, when photographing the object (e.g., player character) from behind using the virtual camera, the image generation section 120 controls the position or the direction of the virtual camera so that the virtual camera follows a change in the position or the direction of the object. In this case, the image generation section 120 may control the virtual camera based on information about the position, direction, speed, and the like of the object obtained by the movement/motion processing section 114. Alternatively, the image generation section 120 may set the virtual camera in a predetermined direction, and may move the virtual camera along a predetermined path. In this case, the image generation section 120 controls the virtual camera based on virtual camera data that specifies the position (moving path) or the direction of the virtual camera. When a plurality of virtual cameras (viewpoints) are provided, the image generation section 120 performs the above control process on each virtual camera.

The vertex process and the pixel process may be implemented by hardware that enables a programmable polygon (primitive) drawing process (i.e., programmable shader (vertex shader and pixel shader)) according to a shader program written in shading language. The programmable shader enables a programmable per-vertex process and a per-pixel process, and increases the degree of freedom of the drawing process so that the representation capability can be significantly improved as compared with a fixed drawing process using hardware.

The image generation section 120 performs a geometric process, texture mapping, hidden surface removal, alpha-blending, and the like when drawing the object.

In the geometric process, the image generation section 120 subjects the object to coordinate transformation, clipping, perspective projection transformation, light source calculation, and the like. The object data (e.g., object's vertex position coordinates, texture coordinates, color data (luminance data), normal vector, or alpha-value) obtained by the geometric process (perspective transformation) is stored in the storage section 200.

The term "texture mapping" refers to a process that maps a texture (texel value) stored in the storage section 200 onto the object. Specifically, the image generation section 120 reads a texture (surface properties such as color (RGB) and alpha-value) from the storage section 200 using the texture coordinates set (assigned) to the vertices of the object, and the like. The image generation section 120 maps the texture (two-dimensional image) onto the object. In this case, the image generation section 120 performs a pixel-texel link process, a bilinear interpolation process (texel interpolation process), and the like.

The image generation section 120 may perform a hidden surface removal process by a Z-buffer method (depth comparison method or Z-test) using a Z-buffer (depth buffer) that stores the Z-value (depth information) of the drawing pixel. Specifically, the image generation section 120 refers to the Z-value stored in the Z-buffer when drawing the drawing pixel corresponding to the primitive of the object. The image generation section 120 compares the Z-value stored in the Z-buffer with the Z-value of the drawing pixel of the primitive. When the Z-value of the drawing pixel is the Z-value in front of the virtual camera (e.g., a small Z-value), the image generation section 120 draws the drawing pixel, and updates the Z-value stored in the Z-buffer with a new Z-value.

The term "alpha-blending" refers to a translucent blending process (e.g., normal alpha-blending, additive alpha-blending, or subtractive alpha-blending) based on the alpha-value (A-value).

Note that the alpha-value is information that can be stored corresponding to each pixel (texel or dot), such as additional information other than the color information. The alpha-value may be used as mask information, translucency (equivalent to transparency or opacity), bump information, or the like.

The image generation section 120 may generate the display image and the calculation image. The image generation section 120 does not perform the pixel process (per-pixel process using a pixel shader) when generating the calculation image. Note that the image generation section 120 may perform the pixel process when it is necessary for the calculation process. When determining the Z-value for the calculation process, the Z-value may be changed based on a predetermined depth relationship between a plurality of objects.

The sound generation section 130 performs a sound generation process based on the results of various processes performed by the processing section 100 to generate game sound such as background music (BGM), effect sound, or voice, and outputs the generated game sound to the sound output section 192.

The image generation device according to one embodiment of the invention may be a device dedicated to a single-player mode that allows only one player to play the game, or may be a device that also implements a multi-player mode that allows a plurality of players to play the game.

Figure 2:
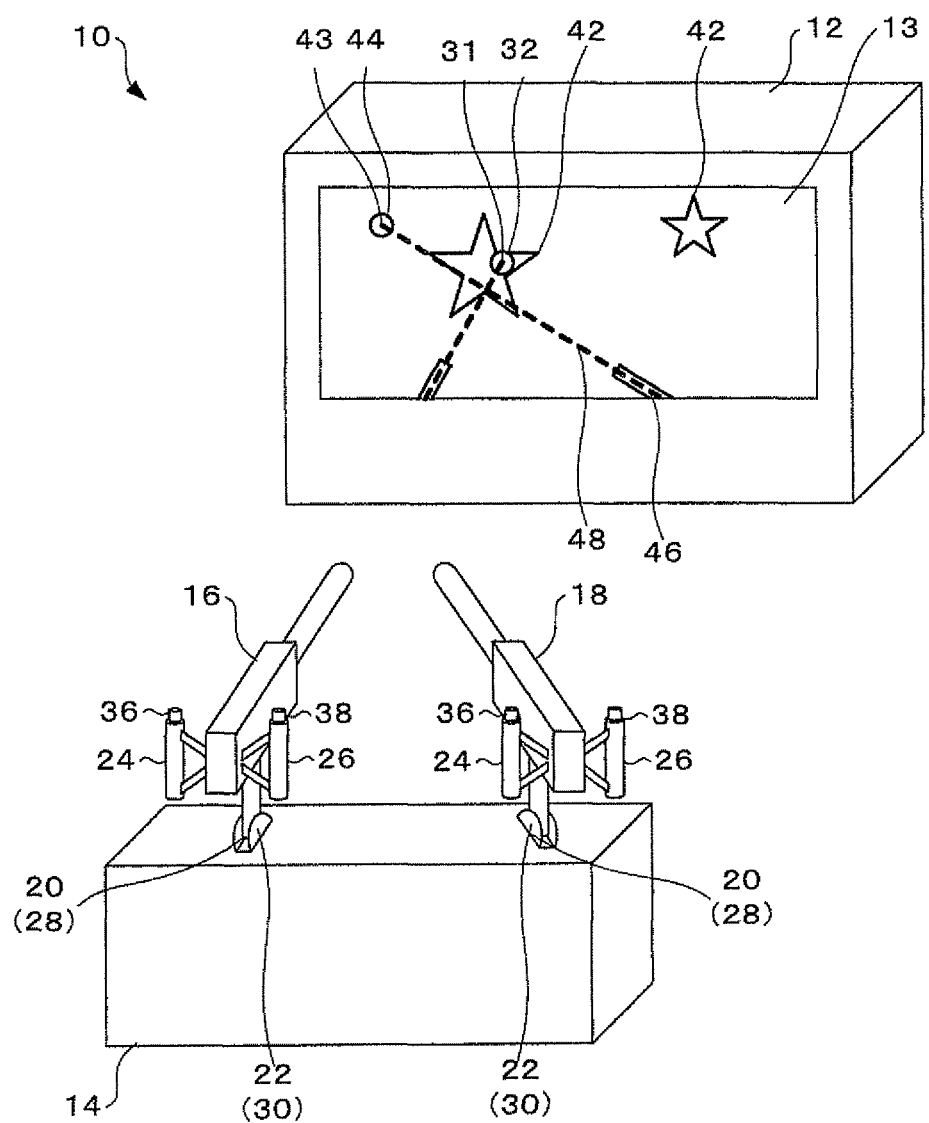
FIG. 2 is an external view illustrating an image generation device according to one embodiment of the invention.

As illustrated in FIG. 2, the multi-player mode may be implemented by providing input sections 160-1 and 160-2 for respective players, and performing an enemy character hit process and the like based on a gun sight position indicated by each of the input sections 160-1 and 160-2, for example. In one embodiment of the invention, data, a display image, a calculation image, and game sound provided to a plurality of players are generated using a single image generation device. Note that the image generation device may exchange data (e.g., input information) with another image generation device via a network, and may perform the image generation process based on the received data and the input information input using the input section 160.

2. Marker Placement Method (1) Example of Input Section

The image generation device according to one embodiment of the invention performs a process that implements a shooting game that allows the player to fire a bullet (i.e., specific object) at an enemy character in an object space.

FIG. 2 is a perspective view illustrating the external configuration of a game system 10 that is implemented by applying the image generation device according to one embodiment of the invention. As illustrated in FIG. 2, the game system 10 includes a display 12 that displays an image, a pedestal 14 that is disposed on the front side of a display screen 13 of the display 12, and a first controller 16 (i.e., first operation section or first indicator) and a second controller 18 (i.e., second operation section or second indicator) that are disposed on the upper side of the pedestal 14 and imitate a machine gun. A single player may play the game using the game system 10, or two or more players (i.e., operators) may play the game at the same time using the game system 10.

The first controller 16 is secured on the pedestal 14 so that the first controller 16 can be rotated around a first axis 20 that is vertical to the upper side of the pedestal 14, and can be rotated around a second axis 22 that is parallel to the upper side of the pedestal 14. A left grip 24 that is held with the left hand of the player, and a right grip 26 that is held with the right hand of the player are provided on the rear end of the first controller 16. The player holds the left grip 24 and the right grip 26, and arbitrarily changes the direction of the end (i.e., muzzle) of the first controller 16 (i.e., changes the indication position of the indicator) by rotating the first controller 16 around the first axis 20 and the second axis 22 (i.e., designating the position). The movable range of the first controller 16 is set so that the end of the first controller 16 can indicate (i.e., designate) a predetermined area within the display screen 13. For example, the movable range of the first controller 16 may be set so that the end of the first controller 16 can indicate the entire display screen 13, or may be set so that the end of the first controller 16 can indicate a limited area within the display screen 13. The first controller 16 includes a first variable resistor 28 that detects the amount of rotation of the first controller 16 around the first axis 20, and a second variable resistor 30 that detects the amount of rotation of the first controller 16 around the second axis 22.

The game system 10 calculates a first indication position 31 (i.e., first designation position) that is a position (i.e., a position within an image or a position within a display area) within the display screen 13 indicated by the end of the first controller 16 as coordinate values (i.e., first information) in a two-dimensional coordinate system (i.e., virtual space) based on the detection results of the first variable resistor 28 and the second variable resistor 30 included in the first controller 16. The game system 10 displays an image in which a first mark 32 (i.e., first designation position indicator or first indicator) that indicates the position indicated by the first controller 16 is disposed at a position within a virtual three-dimensional space (game space) corresponding to the first indication position 31 on the display screen 13.

The game system 10 displays a target object 42 (i.e., display object) that indicates a target on the display screen 13 while moving the target object 42, and determines that a first bullet object 40 has hit the target object 42 when the left button 36 or the right button 38 of the first controller 16 has been pressed in a state in which the center of the first mark 32 is displayed (positioned) within (superimposed on or overlaps) the target object 42.

The second controller 18 includes a left grip 24, a right grip 26, a first variable resistor 28, a second variable resistor 30, a left button 36 (i.e., second operating section), and a right button 38 (i.e., second operating section) in the same manner as the first controller 16. The second controller 18 is secured on the pedestal 14 so that the second controller 18 does not come in contact with the first controller 16, and can be rotated around the first axis 20 and the second axis 22. The movable range of the second controller 18 is set so that the end of the second controller 18 can indicate a predetermined area within the display screen 13.

The game system 10 calculates a second indication position 43 (i.e., second designation position) that is a position within the display screen 13 indicated by the end of the second controller 18 as coordinate values (i.e., second information) in a two-dimensional coordinate system based on the detection results of the first variable resistor 28 and the second variable resistor 30 included in the second controller 18. The game system 10 may display an image in which a second mark 44 (i.e., second designation position indicator or second indicator) that indicates the position indicated by the second controller 18 is disposed at a position within the virtual three-dimensional space (game space) corresponding to the second indication position 43 on the display screen 13.

When the player has pressed the left button 36 or the right button 38 of the second controller 18, the game system 10 moves a second bullet object 48 (i.e., second moving object) that indicates a bullet fired from a second gun object 46 from the end of the second gun object 46 toward the center of the second mark 44.

When the player has pressed the left button 36 or the right button 38 of the second controller 18 in a state in which the center of the second mark 44 is displayed (positioned) within the target object 42, the game system 10 determines that the second bullet object 48 has hit the target object 42.

The game system 10 is thus configured so that the first mark 32, the second mark 44, the first bullet object 40, and the second bullet object 48 move individually based on an arbitrary operation performed using the first controller 16 or the second controller 18. The game system 10 determines whether or not the first bullet object 40 has hit the target object 42, and determines whether or not the second bullet object 48 has hit the target object 42.

(2) Marker Image and Placement of Marker

A marker placement control process according to one embodiment of the invention is described below taking an example in which a marker is a reticle of a shooting game that allows the player to shoot a target object disposed within a virtual three-dimensional space.

Figure 3:
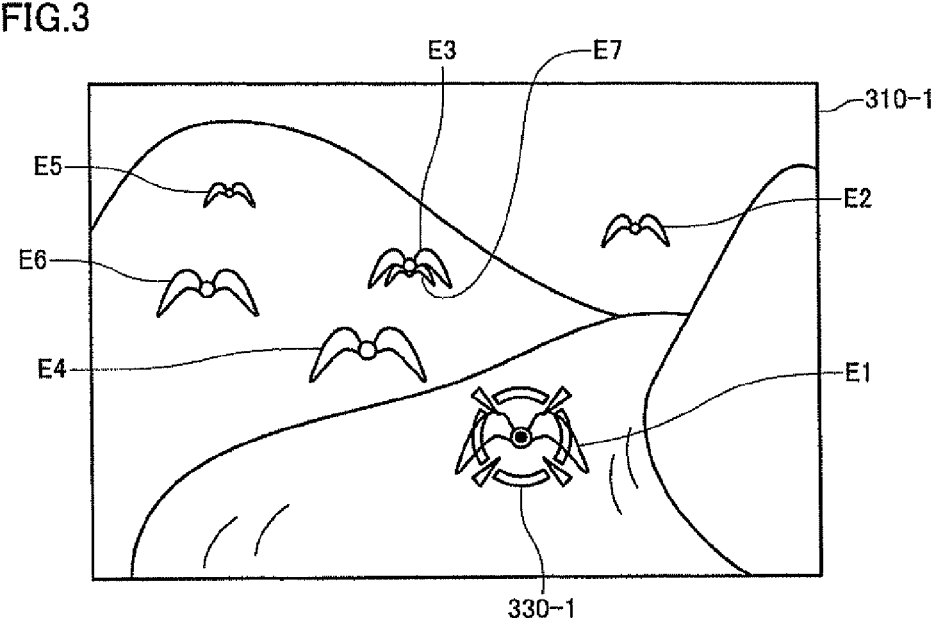
FIG. 3 illustrates an example of a game image according to one embodiment of the invention.

FIG. 3 illustrates an example of a game image according to one embodiment of the invention.

A game image 310-1 illustrated in FIG. 3 is a first-person-viewpoint game image of a virtual three-dimensional space viewed from a virtual camera. The virtual camera is disposed at the position of a player character or a predetermined position around the position of the player character within the virtual three-dimensional space. Note that the game image may be either a two-dimensional image or a three-dimensional (stereoscopic) image.

Reference symbols E1 to E7 indicate target objects that are present within the virtual three-dimensional space. FIG. 3 illustrates an example in which the target objects move and make a motion in the virtual three-dimensional space. Note that the target objects may be stationary.

The player shoots an arbitrary target object by operating the controller illustrated in FIG. 2 while observing the game image. Reference symbol 330-1 indicates a reticle image that is displayed to indicate the position (capture point) aimed at by the player. When the capture target object is present in the capture direction, the reticle image 330-1 is displayed on the front side of the capture target object (see FIG. 3).

Figure 4:
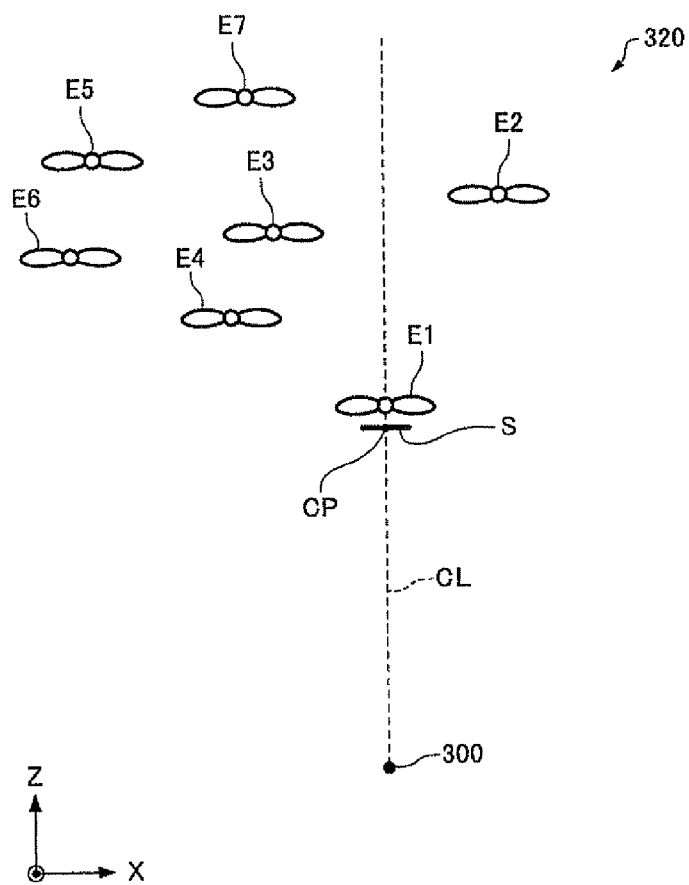
FIG. 4 illustrates a virtual three-dimensional space viewed from a Y-axis direction.

FIG. 4 illustrates the virtual three-dimensional space viewed from a Y-axis direction when the game image illustrated in FIG. 3 is generated. A reticle object S corresponding to the reticle is disposed at a capture point CP in a virtual three-dimensional space 320 in order to generate the reticle image 330-1.

Since the reticle indicates a direction (capture direction) CL in which the player aims at the capture target object, the reticle object S is disposed at a position along the capture direction (capture line) CL in the virtual three-dimensional space. For example, when the target object E1 is present in the capture direction, the target object is the capture target. The capture point CP is set at a position on the front side of the target object E1 (may be set at the position of the target object E1) in the capture direction (capture line) CL, and the reticle object S is disposed at the capture point CP.

Figure 5:
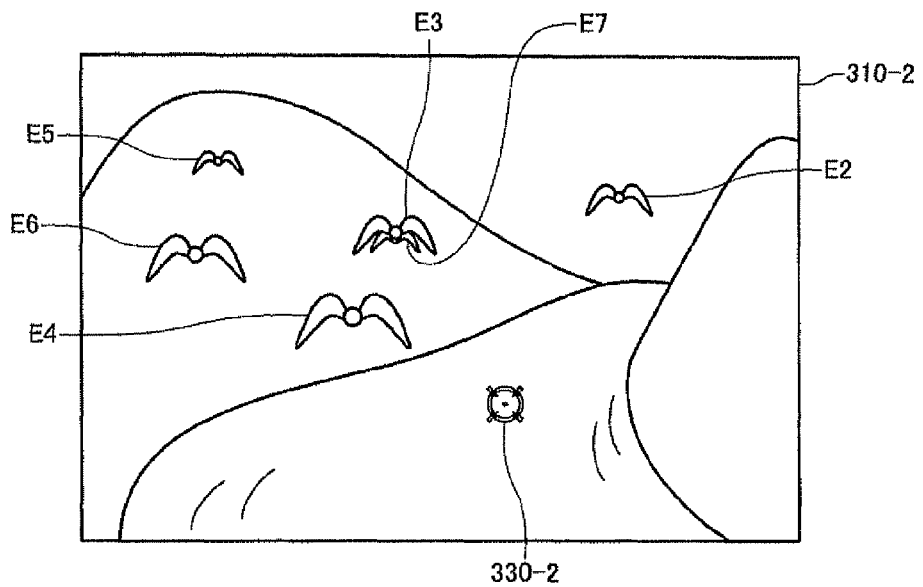
FIG. 5 illustrates an example of a game image according to one embodiment of the invention.
Figure 6:
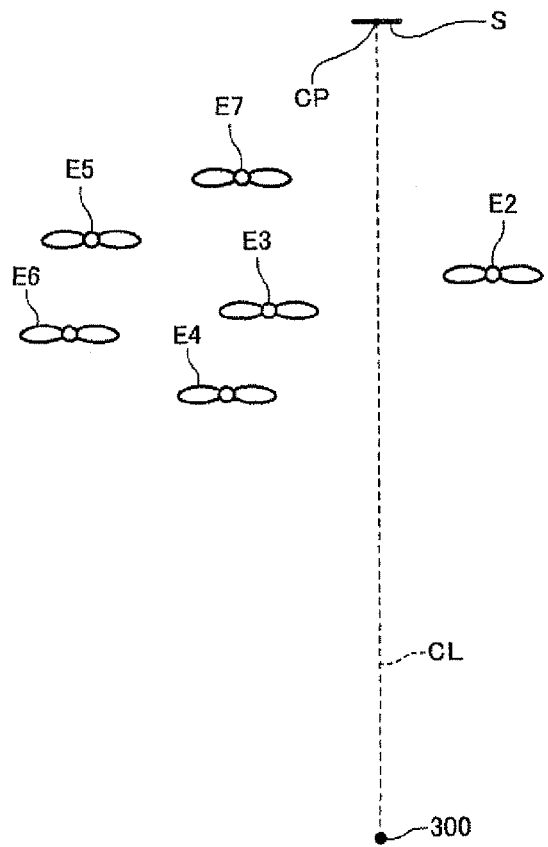
FIG. 6 illustrates a virtual three-dimensional space viewed from a Y-axis direction.

FIG. 5 illustrates another example of the game image according to one embodiment of the invention, and FIG. 6 illustrates the virtual three-dimensional space viewed from the Y-axis direction when the game image illustrated in FIG. 5 is generated. FIGS. 5 and 6 illustrate an example in which the capture direction is the same as that illustrated in FIGS. 3 and 4, but a target object as the capture target is not present in the capture direction. In this case, the depth value (i.e., the Z-coordinate value in the world coordinate system) of the point at which the reticle object S is disposed is set to the depth value of a drawn object (e.g., background) that is positioned furthest from the virtual camera in the capture direction, or the depth value of a preset deepest position, for example. Therefore, since the reticle object is disposed away from a virtual camera 300 as compared with FIGS. 3 and 4, the size of the reticle image 330-2 displayed within the game image 310-2 decreases.

Figure 7:
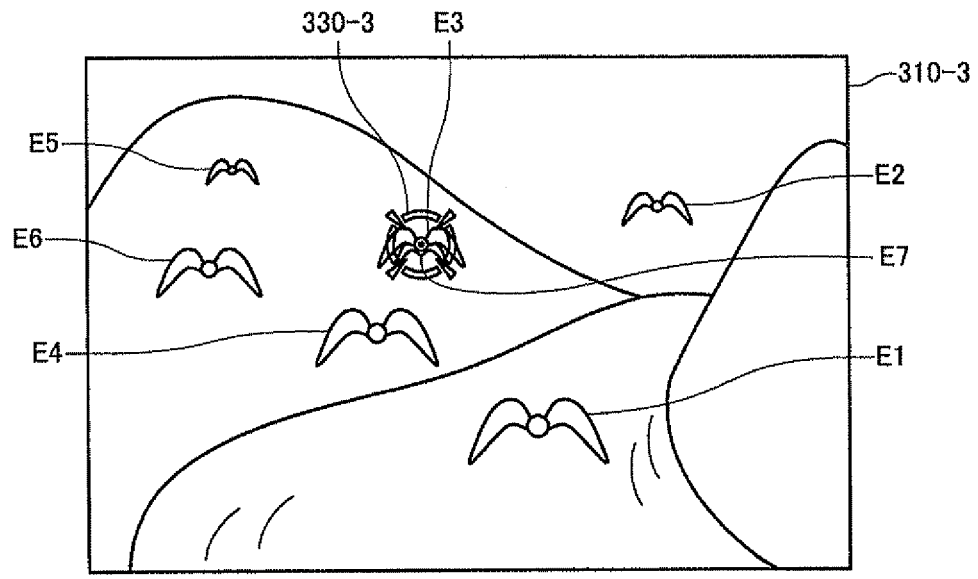
FIG. 7 illustrates an example of a game image according to one embodiment of the invention.
Figure 8:
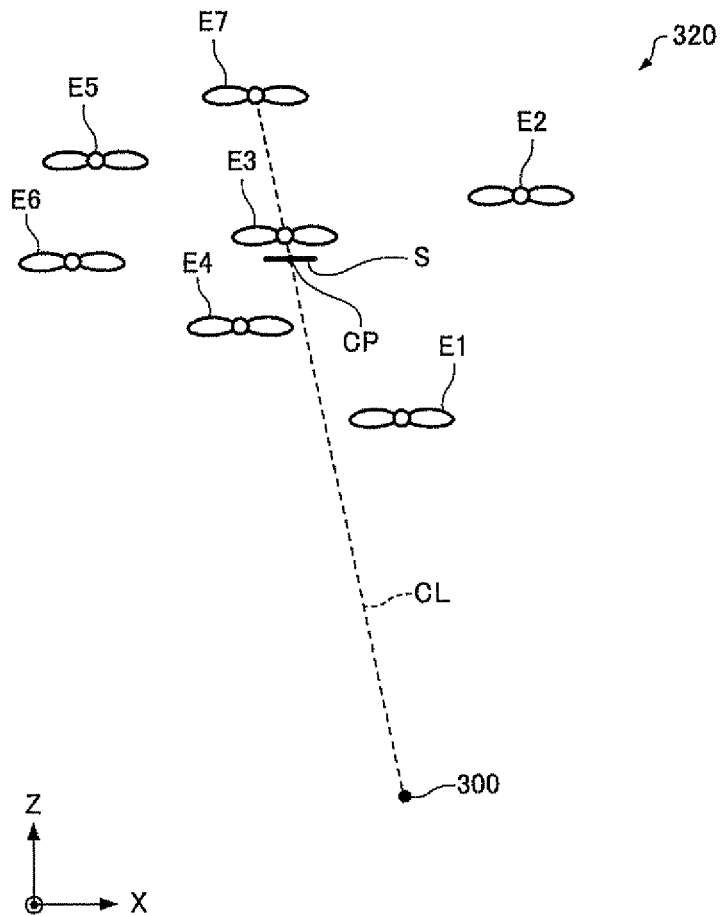
FIG. 8 illustrates a virtual three-dimensional space viewed from a Y-axis direction.

FIG. 7 illustrates another example of the game image according to one embodiment of the invention, and FIG. 8 illustrates the virtual three-dimensional space viewed from the Y-axis direction when the game image illustrated in FIG. 7 is generated. As illustrated in FIG. 8, the target objects E3 and E7 are present along the capture direction (capture line) CL. In this case, the target object E3 that is positioned on the front side in the capture direction (i.e., a target object having a depth value closer to that of the virtual camera 300) is determined to be the capture target. The capture point CP is set at a position on the front side of the target object E3 (may be set at the position of the target object E3) in the capture direction (capture line) CL, and the reticle object S is disposed at the capture point CP.

(3) Capture Direction (Capture Line)

Figure 9A:
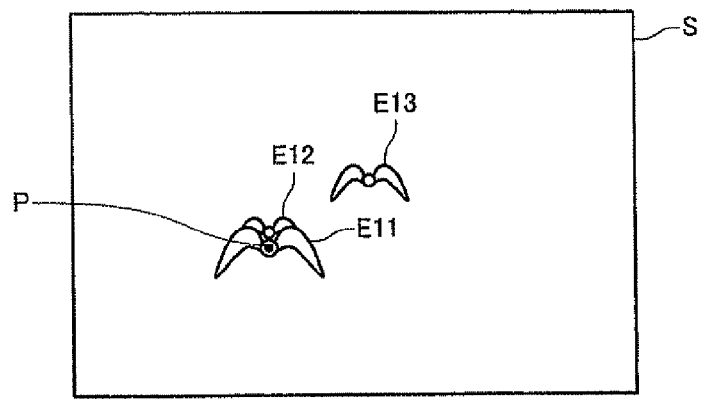
FIGS. 9A to 9C illustrate the concept of a capture direction according to one embodiment of the invention.
Figure 9B:
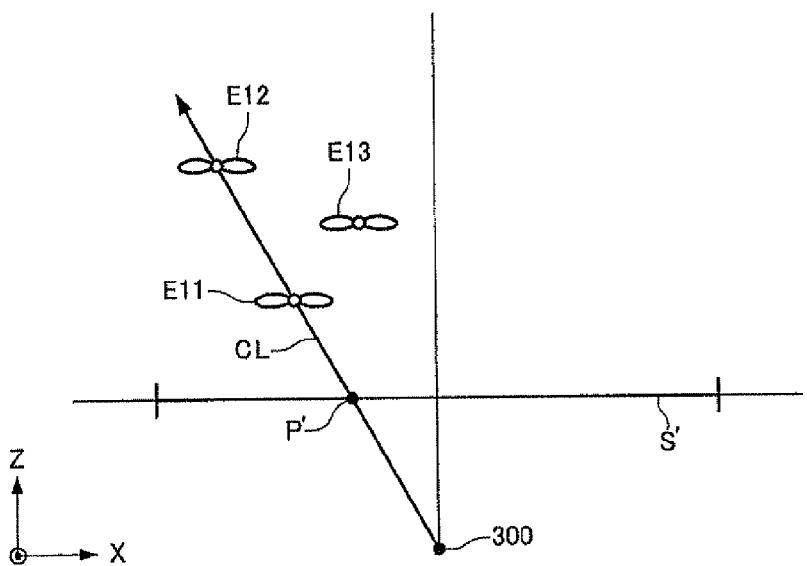
Figure 9C:
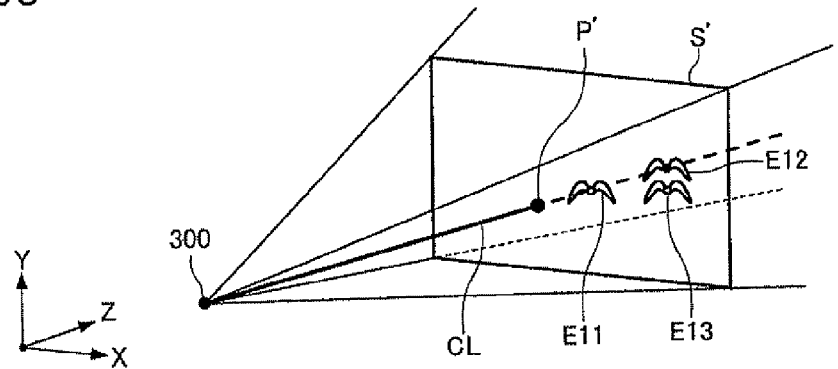

FIGS. 9A to 9C illustrate the concept of the capture direction according to one embodiment of the invention. Reference symbol P in FIG. 9A indicates an indication position of a controller (shooting device) within an image (i.e., an image displayed on a screen S of a game device). The indication position P is specified based on controller output information (i.e., output information that can specify the tilt and the indication position of the controller), as described with reference to FIG. 2. A virtual screen S' corresponding to the screen S is disposed within the virtual three-dimensional space. FIGS. 9B and 9C illustrate a state in which the virtual screen S' is disposed within the virtual three-dimensional space. A point P' on the virtual screen S' corresponds to the indication position P on the screen S of the game device (e.g., a point having the same X-coordinate value and the same Y-coordinate value as those of the indication position P).

When using a first-person viewpoint, a direction (straight line) that connects the virtual camera 300 and the point P' is determined to be the capture direction (capture line) CL. FIGS. 9B and 9C illustrate a state in which the target objects E11 and E12 are present along the capture direction (capture line) CL.

Note that the virtual camera refers to a virtual camera positioned at the center between the right eye and the left eye of the player, or a virtual camera disposed at the muzzle of a controller that imitates a gun.

(4) Capture Target Determination Process

Figure 21:
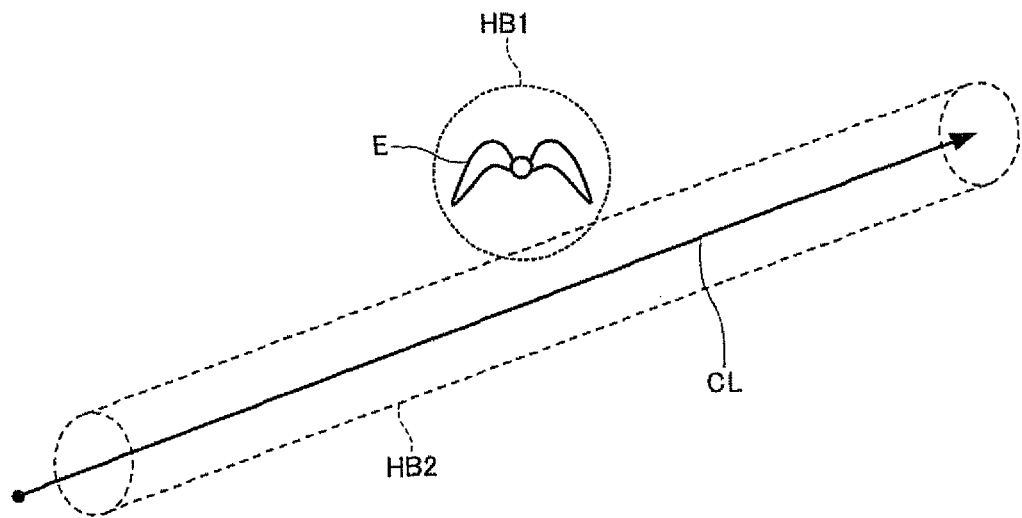
FIG. 21 illustrates a capture target determination process.

FIG. 21 illustrates a capture target determination process.

As illustrated in FIG. 21, a first hit check volume HB1 may be set to the target object E disposed within the virtual three-dimensional space. A hit check may be performed based on the first hit check volume HB1 and the capture direction (capture line) CL, and the capture target object may be determined based on the hit check result.

A hit check (intersection determination process) may be performed on the first hit check volume HB1 and a second hit check volume HB2 that is set based on the capture direction (capture line) CL, and the capture target object may be determined based on the hit check (determination) result.

A first hit check plane may be set to the target object E disposed within the virtual three-dimensional space, a hit check may be performed based on the first hit check plane and the capture direction, and the capture target object may be determined based on the hit check result.

For example, a hit determination image may be generated based on the first hit check plane using a rendering hit process, the indication position in the screen plane may be determined based on the capture direction, and the capture target object may be determined based on the pixel values of the pixels present in a determination area including the position corresponding to the indication position within the hit determination image.

The term "rendering hit process" refers to a method that generates an image including a plurality of objects based on pixel data that discriminates the plurality of objects, acquires the indication position within the image based on the input information input using the input section, and determines the object indicated by the pixel(s) corresponding to the indication position based on the pixel data about the pixel(s) corresponding to the indication position. The rendering hit process is described in detail below.

When using the rendering hit process, a display image D displayed on the display section 190 and a calculation image E (E1 to E3) are generated, and a hit determination process is performed based on the calculation image E.

Specifically, the calculation image E is generated so that a plurality of objects (e.g., enemy object and background object) other than a bullet object present within the object space are color-coded. The pixels of the calculation image E within a predetermined range corresponding to the indication position (reticle position) are selected, and it is determined that the enemy object has been hit when the color of the selected pixels indicates the enemy object. This makes it possible to reduce the processing load as compared with a method that performs a hit determination process on the ray of a bullet and an object within a three-dimensional object space.

Figure 26B:
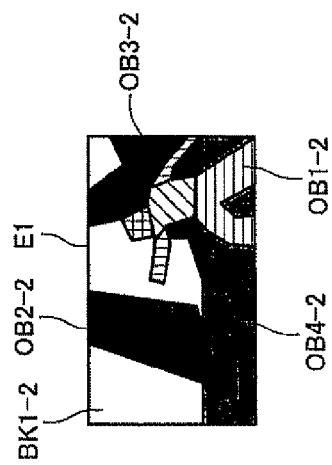
FIG. 26B illustrates an example of a calculation image.

The display image D and the calculation image E1 (hit check image E1) are generated as described below. In one embodiment of the invention, the display image D illustrated in FIG. 26A and the calculation image E1 illustrated in FIG. 26B are generated every frame (e.g., every 1/60th of a second).

Figure 27A:
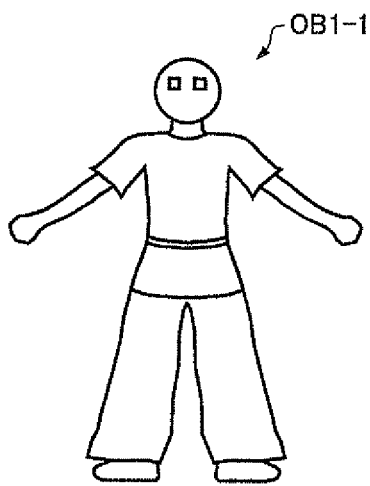
FIG. 27A illustrates an example of an object used for a display image.
Figure 27B:
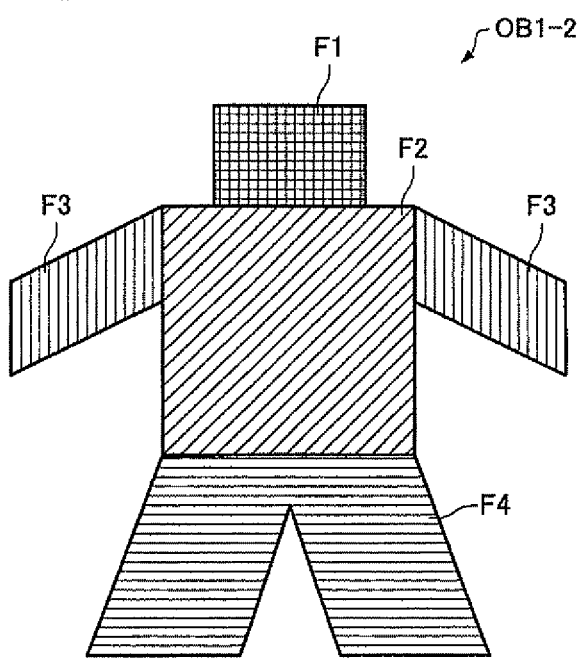
FIG. 27B illustrates an example of an object used for a calculation image.

FIGS. 27A and 27B illustrate object data (model data) about an enemy object OB1. FIG. 27A illustrates the object data about an enemy object OB1-1 used for the display image D. FIG. 27B illustrates the object data about an enemy object EOB1-2 used for the calculation image E1. Specifically, the object (model) used for the calculation image E1 is a simple object for which the number of vertices is smaller than that of the object used for the display image D. In one embodiment of the invention, the display image D is generated using the enemy object OB1-1. The calculation image E1 is drawn using the enemy object EOB1-2 for which the number of vertices is reduced as compared with the enemy object OB1-1 used for the display image D. Specifically, since the calculation image E1 is used for the hit determination process, it is desirable to use a simple object for which the number of vertices is reduced as compared with the object used for the display image D taking account of a reduction in processing load and an improvement in efficiency of the hit determination process.

When generating the calculation image E, the (R, G, B, A) values of the vertex data about each object are determined to be (discriminable) (R, G, B, A) values that specify the object. When the object is formed by a plurality of parts, the (R, G, B, A) values of the object are determined to be (discriminable) (R, G, B, A) values that specify each part of the object. The calculation image E1 is generated based on the determined (R, G, B, A) values of the vertex data about the object.

Specifically, when generating the calculation image E1, a plurality of objects are color-coded, and a plurality of parts of each object are also color-coded.

Figures 28A, 28B:
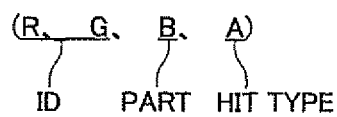
FIGS. 28A and 28B are views illustrating discrimination of each object based on color information or translucency information.

As illustrated in FIG. 28A, the ID of each object is determined based on the R-value and the G-value, the part of the object is determined based on the B-value, and the hit type is determined based on the A-value. Note that the hit type classifies each object. For example, each object may be classified as "character", "background", or "object other than character and background".

As illustrated in FIG. 28B, the (R, G, B, A) values of the vertex data about a head object F1 (ID=1, part=1, hit type=1) of the enemy character OB1-2 are determined to be (1, 1, 1, 1), for example.

The (R, G, B, A) values of each object are thus determined. When the object is formed by a plurality of parts, the (R, G, B, A) values of each part are also determined as described above. The calculation image E1 is generated based on the (R, G, B, A) values thus determined.

Specifically, the display image D and the calculation image E1 are generated as described below. A display object (e.g., OB1-1) is disposed in the world coordinate system (three-dimensional object space), and the display image D is drawn using the virtual camera. Likewise, a calculation object (e.g., OB1-2) is disposed in the world coordinate system, and the calculation image E1 is drawn using the virtual camera. In one embodiment of the invention, the display image D and the calculation image E1 are generated based on the position, the direction, and the angle of view of an identical virtual camera.

Note that the calculation image E1 may be drawn at an angle of view higher than that employed when drawing the display image D. This makes it possible to implement hit determination over a wide range.

The calculation image E1 is generated so that the calculation image E1 does not include a bullet object (specific object) (i.e., attack object). This is because it is necessary to determine whether or not the bullet object has hit an object other than the bullet object.

The pixel process is performed after the vertex process when generating the display image D. On the other hand, the pixel process is not performed after the vertex process when generating the calculation image E1 so that the color coding of each object (part object) is maintained. Specifically, the calculation image is generated so that the vertex color of the polygon of each object (part object) is identical (i.e., the polygon of each object has a uniform color). If the color of each pixel is changed by the pixel process, an accurate hit determination process cannot be implemented.

Figure 29A:
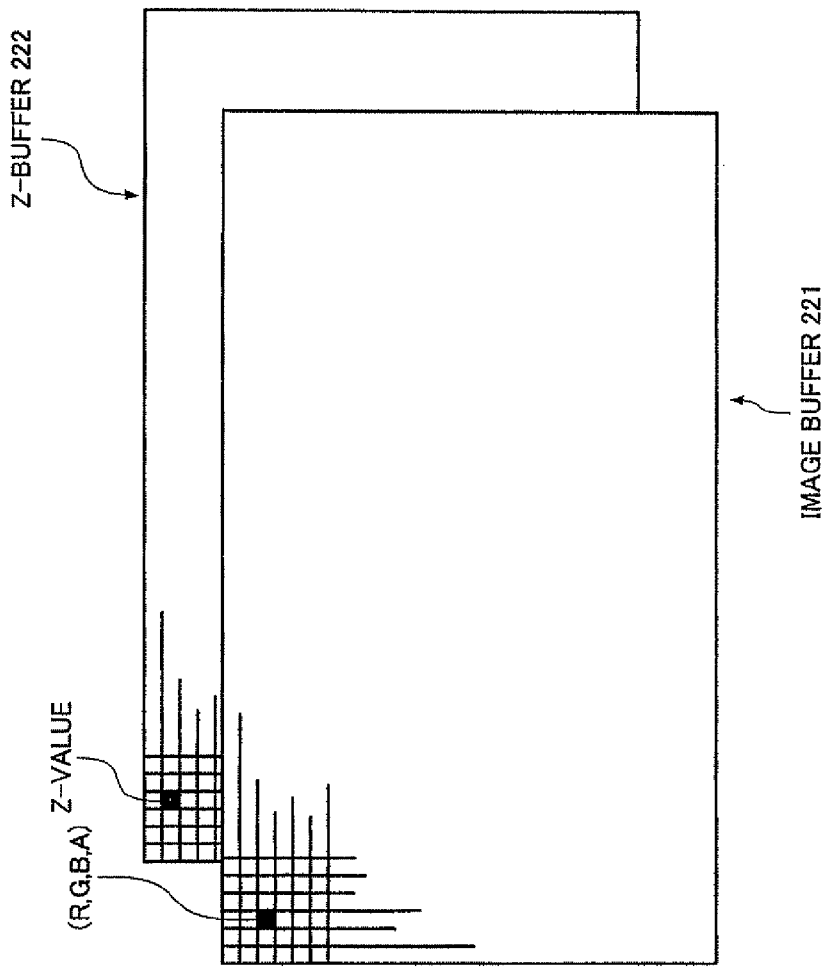
FIG. 29A illustrates an image buffer and a Z-buffer that store a display image.
Figure 29B:
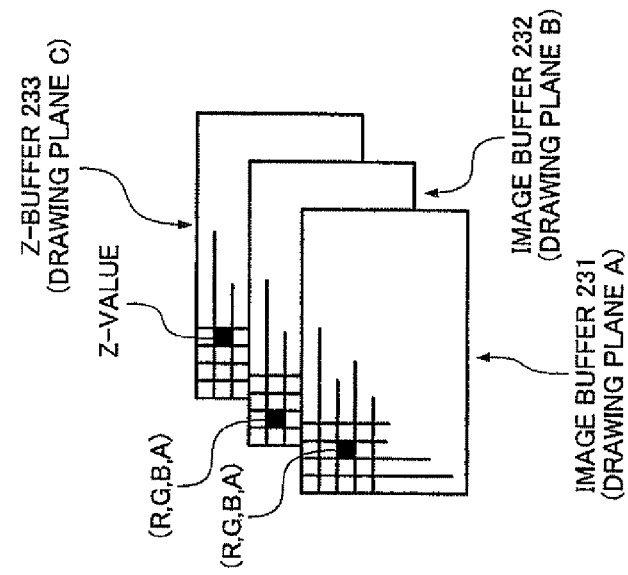
FIG. 29B illustrates an image buffer and a Z-buffer that store a calculation image.

The display image D is drawn in the image buffer 221 (see FIG. 29A), and the calculation image E1 is drawn in the calculation image buffer 231 (see FIG. 29B). Since the calculation image buffer 231 (232, 233) is a reduction buffer (1/8 frame buffer), the resolution of the calculation image E is lower than that of the display image D. However, a hit determination process that does not cause inconsistency can be performed using such a calculation image. Moreover, the processing load due to the drawing process (processing load of the GPU) for generating the calculation image E can be reduced by utilizing the reduction buffer.

The Z-buffer 222 illustrated in FIG. 29A stores the Z-value (depth value) of each pixel of the display image D, and the Z-buffer 233 illustrated in FIG. 29B stores the Z-value of each pixel of the calculation image E1.

Figure 26A:
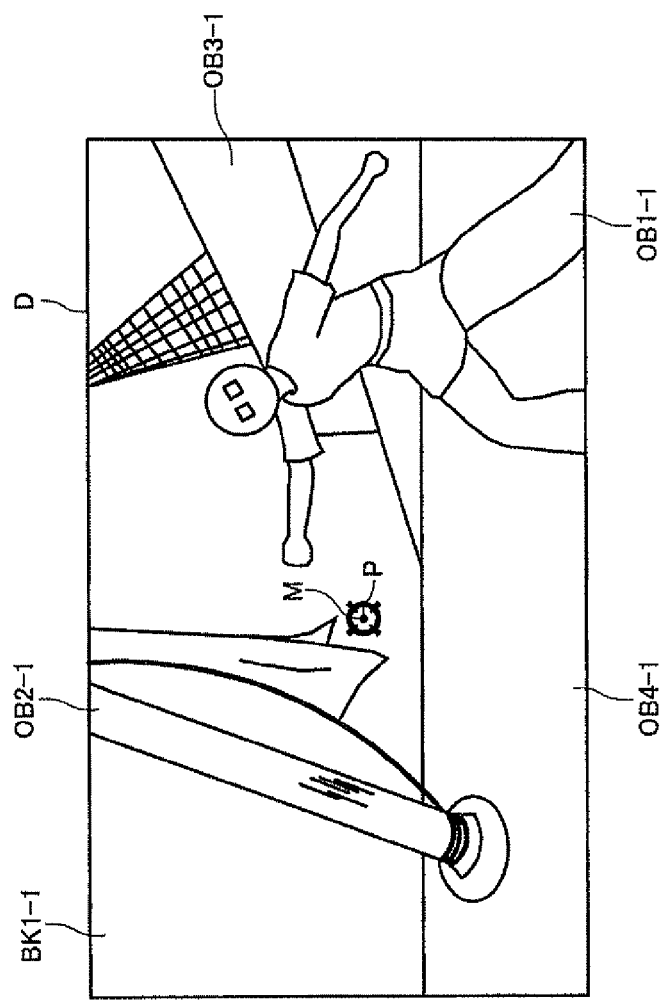
FIG. 26A illustrates an example of a display image.

As illustrated in FIG. 26A, a reticle (i.e., indication marker) M is drawn within the display image D at the indication position P indicated by the input section 160. Specifically, the player performs an input operation that aims the reticle M at the shooting target while observing the display image D. As illustrated in FIG. 26B, the reticle M is not drawn within the calculation image E1. If the reticle M is drawn within the calculation image E1, the hit determination process may be adversely affected.

The vertex data (R, G, B, A) about each vertex of the object that forms the model data illustrated in FIG. 27A may include (part of) information about the (R, G, B, A) values defined in advance (see FIG. 28B).

The display image D and the calculation image E1 are generated as described above.

The hit determination process is described below. Specifically, one or more pixels of the calculation image E1 within a hit area (predetermined range) N based on the indication position Q are selected (extracted), and whether or not the bullet object has hit a given object is determined based on the color information or the translucency information (R, G, B, A) about the selected pixel(s).

As illustrated in FIGS. 30A and 30B, the indication position P within the display image D and the indication position Q within the calculation image E1 corresponding to the indication position P are acquired based on the input information input using the input section 160, for example. Note that the indication position P within the display image D may be converted into the indication position Q within the calculation image E1. For example, since the size of the calculation image E1 is ⅛th of the size of the display image D, the indication position Q may be calculated based on the size ratio.

Figure 31A:
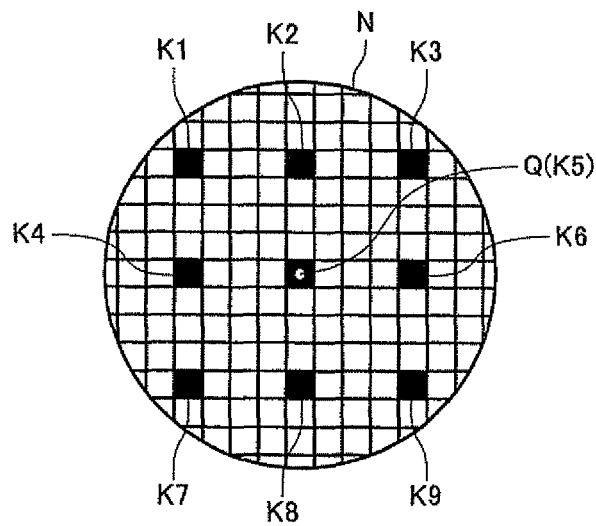
FIGS. 31A to 31C illustrate a hit area and a pixel selection method.
Figure 31B:
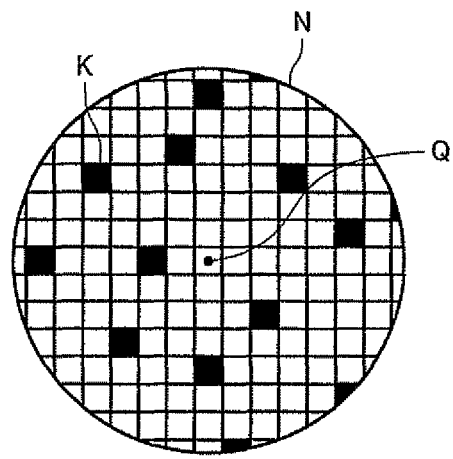
Figure 31C:
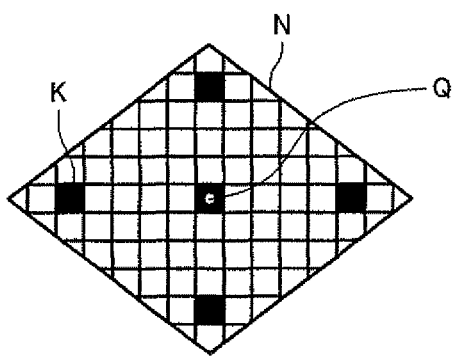

As illustrated in FIGS. 31A to 31C, a plurality of pixels of the calculation image E1 within the hit area N that is set around the indication position Q are selected. For example, a plurality of pixels may be selected at predetermined intervals, as illustrated in FIG. 31A. Alternatively, a predetermined number of pixels within the hit area N may be randomly selected, as illustrated in FIG. 31B.

The hit area N is set based on at least one of the shape and the size of the reticle M. This makes it possible for the player to cause the bullet object to hit an object within the display image D corresponding to the shape and/or the size of the reticle M.

For example, when the reticle M has a circular shape (see FIG. 30A), the hit area N is set to have a circular shape.

When the reticle M displayed within the display image D has a diamond shape, the hit area N is set to have a diamond shape (see FIG. 31C). In this case, the pixels of the calculation image E1 positioned at the indication position Q and the vertices of the diamond may be selected.

When arbitrary pixels within the hit area have been selected, whether or not the bullet object has hit a given object is determined based on the (R, G, B, A) values (i.e., pixel data) of the pixels.

For example, when pixels K1 to K9 have been selected (see FIG. 31A), whether or not the bullet object has hit a given object is determined based on the (R, G, B, A) values of each of the pixels K1 to K9. The hit area (part) of the object that has been determined to be hit by the bullet object is determined based on the (R, G, B, A) values of each of the pixels K1 to K9.

For example, when the color information (R, G) about the pixel K1 is (1, 1), it is determined that the enemy object OB1 has been hit by the bullet object since the color information (1, 1) (=(R, G)) indicates "ID=1". Specifically, it can be determined that the object indicated by the pixel K1 is the enemy object OB1 based on the color information about the pixel K1. It is thus determined that the bullet object has hit the enemy object OB1. When the B-value (color information) of the pixel K1 is 1, it is determined that the bullet object has hit the head F1 of the enemy object OB1. Specifically, it can be determined that the object indicated by the pixel K1 is the head F1 of the enemy object OB1 based on the color information about the pixel K1. It is thus determined that the bullet object has hit the head F1 of the enemy object OB1. Specifically, when the color information (R, G, B, A) about the pixel K1 are (1, 1, 1, 1), it is determined that the bullet object has hit the head F1 of the enemy object OB1 (see FIG. 28B).

Note that it may be determined that the bullet object has hit the object that is closest to the projection plane (i.e., closest to the viewpoint) corresponding to each hit type referring to the depth value of each of the pixels K1 to K9 stored in the Z-buffer 233.

For example, the pixels K1 to K9 are classified by the hit type based on the translucency information A about the pixels K1 to K9. For example, when the pixels K1 and K2 are classified as the hit type "character" (A=1), and it has been determined that the pixel K1 is positioned closer to the virtual camera referring to the depth values of the pixels K1 and K2, it is determined that the bullet object has hit the character determined by the (R, G, B, A) values of the pixel K1. Likewise, an object that has been hit by the bullet object is determined corresponding to the hit type "background" (A=2) and the hit type "another object" (A=3).

The hit determination process is performed at a timing at which the trigger of the input section 160 has been pulled (i.e., at a timing at which the attack input information has been detected). Specifically, it is determined that the bullet object has hit another object in the object space at a timing at which the trigger has been pulled.

When the object indicated by the (R, G, B, A) values of the selected pixel is an enemy object, a given calculation process is performed corresponding to the enemy object. For example, a hit process that causes the enemy object to be hit by the bullet object is performed. More specifically, a process that controls the parameter (e.g., strength value) of the enemy object (e.g., subtraction process), or an effect process that causes the enemy object to be attacked (attack motion process) is performed. A process that generates a display image in which the bullet object hits the enemy object is also performed. A process that adds points to the score of the player character may be performed when the bullet object has hit the enemy object.

The rendering hit process can thus reduce the processing load due to the wide-range hit determination process. The rendering hit process makes it possible to perform the hit determination process on the bullet object and another object based on the (R, G, B, A) values of the selected pixel without determining whether or not the bullet object has hit another object in the three-dimensional space. Since a three-dimensional calculation process need not be performed when using the above method, the processing load can be reduced.

Note that the hit determination process may be performed in a state in which the bullet object is not present in the object space. Specifically, the hit determination process may be performed on the assumption that the bullet object has hit a given object based on the (R, G, B, A) values of the selected pixel of the calculation image.

(5) Normal Control Process

Figure 10:
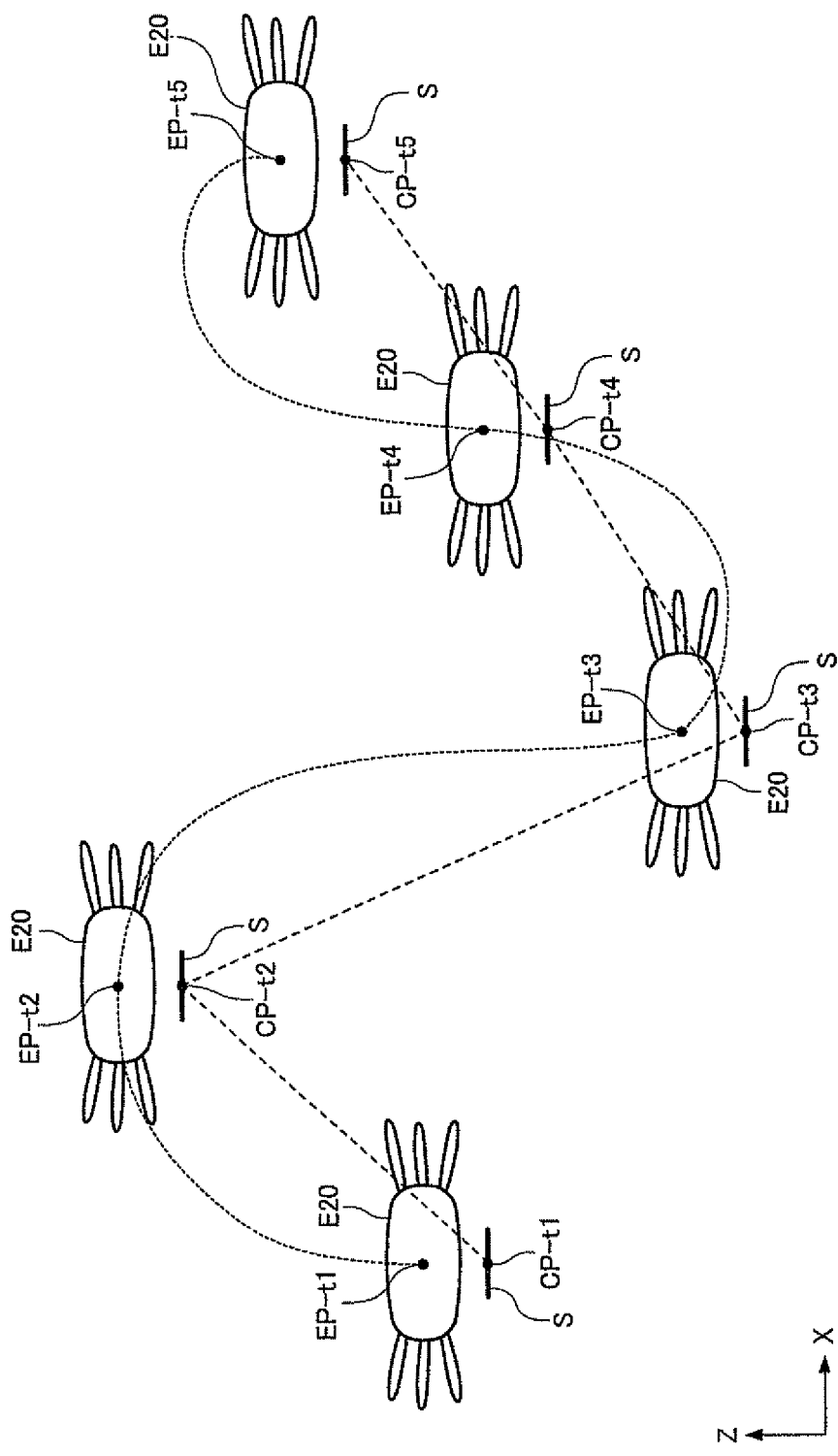
FIG. 10 illustrates a normal control process that controls the depth value of a reticle (marker) when the capture target is identical.

FIG. 10 illustrates a normal control process that controls the depth value of the reticle (marker) when the capture target is identical. The following description is given taking an example in which a target object E20 moves along a path 360 in the virtual three-dimensional space. Reference symbols EP-t1, EP-t2, EP-t3, EP-t4, and EP-t5 indicate the positions of the target object in frames corresponding to times t1, t2, t3, t4, and t5, respectively. In this case, when the player has moved the indication position of the controller to follow the movement of the target object E20, the depth component (e.g., Z-coordinate value) of positions CP-t1, CP-t2, CP-t3, CP-t4, and CP-t5 of the capture point (where the reticle object S is disposed) at the times t1, t2, t3, t4, and t5 changes corresponding to the depth component (e.g., Z-coordinate value) of the positions EP-t1, EP-t2, EP-t3, EP-t4, and EP-t5 of the target object E20 at the times t1, t2, t3, t4, and t5, respectively.

Specifically, when the capture target is identical (normal control process), the capture point is instantaneously located at a position corresponding to the depth value of the capture target (e.g., a position having the same depth value as that of the capture target or a position closer to the virtual camera by deltaZ). Therefore, the degree of change in the depth value of the capture point is identical with the degree of change in the depth value of the capture target (e.g., the moving speed in the depth direction), and the change value in the depth value of the capture point (e.g., the moving distance in the depth direction) is also identical with the change value in the depth value of the capture target.

Figure 11:
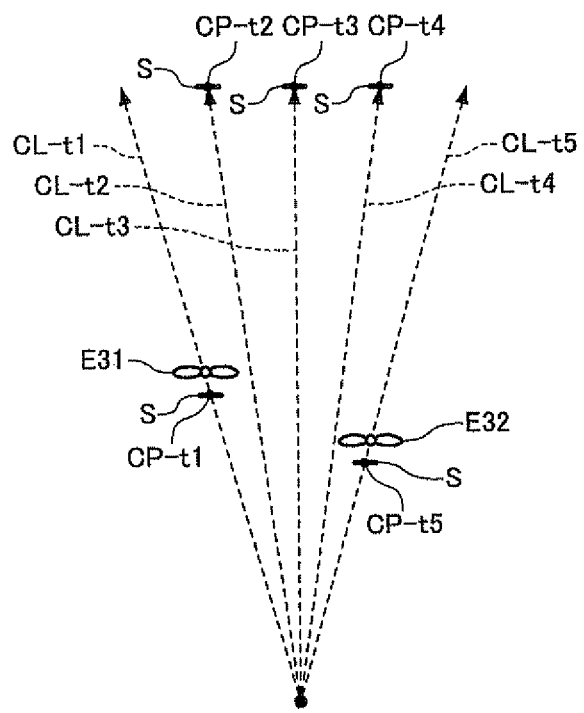
FIG. 11 illustrates a normal control process when a capture target has been lost.

FIG. 11 illustrates a problem that may occur when performing the normal control process when a transition has occurred from a state in which the capture target is present to a state in which the capture target is not present. An example in which the capture direction is changed in a state in which the target object is stationary is described below for convenience of illustration.

For example, when target objects E31 and E32 are present in the virtual three-dimensional space, and the target object E31 is present in the capture direction (capture line) at a time t1, the capture point where the reticle object S is disposed is set on the front side of the target object E31 (capture target) (may be set at the same position as that of the target object E31) at the time t1.

When the capture direction (capture line) has changed to CL-t2, CL-t3, CL-t4, and CL-t5 at times t2, t3, t4, and t5, since the capture target object is not present in the capture direction (capture line) CL-t2, CL-t3, or CL-t4 at the times t2, t3 and t4, the capture point where the reticle object S is disposed is set to CP-t2, CP-t3, or CP-t4 (i.e., the position of a drawn object (e.g., background) that is positioned furthest from the virtual camera in the capture direction, or the position of a preset deepest position) in the capture direction (capture line) CL-t2, CL-t3, or CL-t4.

Since the target object E32 (capture target) is present in the capture direction (capture line) CL-t5 at the time t5, the capture point where the reticle object S is disposed is set to the front side of the target object E32 (may be set at the same position as that of the target object E32) (capture point CP-t5).

Specifically, since the depth value of the capture point where the reticle object S is set rapidly changes when a transition has occurred from a state in which the capture target is present in the capture direction to a state in which the capture target is not present in the capture direction, the reticle suddenly moves to a deep position inside the virtual three-dimensional space. Therefore, it may be difficult for the player to determine the reticle position. A similar situation (i.e., a rapid change in depth value) also occurs when the player changes the direction of the controller (shooting device) in order to change the capture target from the target object E31 to the target object E32, or when the player loses the target object due to the movement of the target object, or when the capture target has been shot and disappeared, for example.

(6) Control Process that does not Change Depth Value of Capture Point for Predetermined Period A control process that does not change the depth value of the capture point for a predetermined period is described below as an example of a process that controls the depth value of the capture point when a transition has occurred from a state in which the capture target is present in the capture direction to a state in which the capture target is not present in the capture direction (i.e., when the capture target has been lost).

Figure 12:
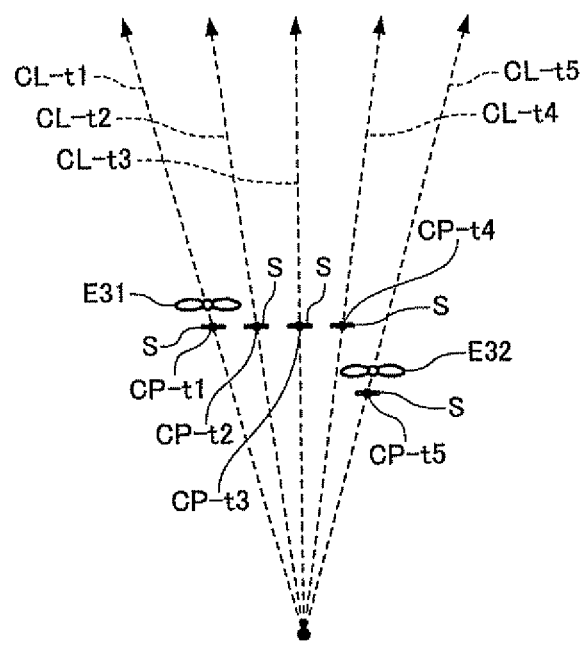
FIG. 12 illustrates an example of a control process that does not change the depth value for a predetermined period when the capture target has been lost due to a change in the capture direction.

FIG. 12 illustrates an example of the control process that does not change the depth value of the capture point for a predetermined period when the capture target has been lost due to a change in the capture direction. As illustrated in FIG. 12, the target object E31 (capture target) is present in the capture direction CL-t1 at the time t1, and no target object (capture target) is present in the capture direction CL-t2 at the time t2.

In this case, the depth value of the capture point where the reticle object S is disposed may not be changed for a predetermined period (time) in order to avoid a rapid backward movement of the reticle.

For example, the depth value of the capture point may not be changed for k1 frames after a transition to a state in which the capture target is not present in the capture direction has occurred. When t5-t2<k1, the depth value of the capture point is not changed from the time t2 to the time t4. Therefore, the capture points CP-t2 to CP-t4 at the times t2 to t4 are disposed along the capture directions (capture lines) CL-t2 to CL-t4 at the same depth value as that of the capture point CP-t1 at the time t1. Since a transition from a state in which the capture target is not present in the capture direction to a state in which the capture target is present in the capture direction occurs at the time t5, the depth value of the capture point CP-t5 may be instantaneously changed to a position on the front side of the target object E32 (may be changed to the same position as that of the target object E32).

Therefore, since the depth value of the capture point does not change even if the capture target has been lost due to a change in the capture direction, the reticle can be smoothly moved to another target object positioned near the reticle without causing a rapid backward movement of the reticle.

The above control process is also effective when the capture target has been lost due to the movement of the capture target, or when the capture target has been lost due to a change in the capture direction and the movement of the capture target. The above control process is also effective when the capture target has been lost due to disappearance of the capture target (e.g., the capture target has been shot).

Figure 13:
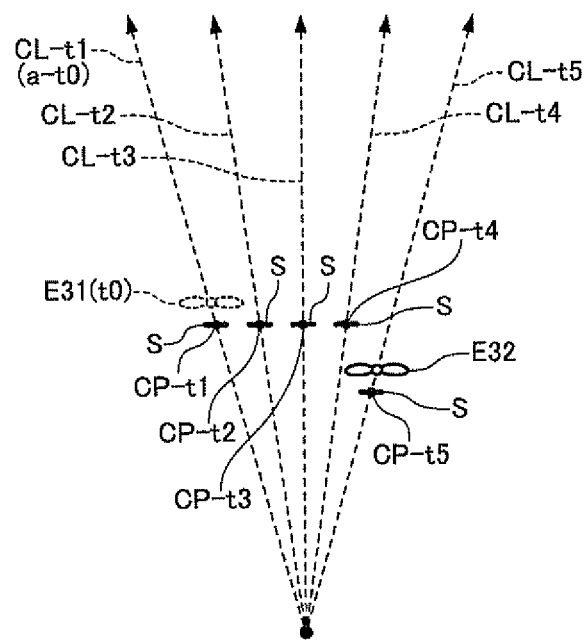
FIG. 13 illustrates an example of a control process that does not change the depth value of a capture point for a predetermined period when the capture target has been lost due to disappearance of the capture target.

FIG. 13 illustrates an example of the control process that does not change the depth value of the capture point for a predetermined period when the capture target has been lost due to disappearance of the capture target.

As illustrated in FIG. 13, the target object E31 (capture target) is present in the capture direction CL-t0 at the time t1, and no target object (capture target) is present in the capture direction CL-t1 at the time t1 due to disappearance of the capture target (e.g., the capture target has been shot). In this case, the depth value of the reticle may not be changed for a predetermined period (time) in the same manner as in FIG. 12 in order to avoid a rapid backward movement of the reticle.

For example, the depth value of the capture point may not be changed for k1 frames after a transition to a state in which the capture target is not present in the capture direction has occurred. When t5-t1<k1, the depth value of the capture point is not changed from the time t1 to the time t4. Therefore, the capture points CP-t1 to CP-t4 at the times t1 to t4 are disposed along the capture directions (capture lines) CL-t1 to CL-t4 at the same depth value as that of the capture point CP-t0 at the time t0. Since a transition from a state in which the capture target is not present in the capture direction to a state in which the capture target is present in the capture direction occurs at the time t5, the depth value of the capture point CP-t5 may be instantaneously changed to a position on the front side of the target object E32 (may be changed to the same position as that of the target object E32).

Although an example in which the capture direction changes with time has been described above, the above description also applies to a case where the capture direction does not change for a while after the capture target has disappeared. In this case, the capture point is disposed at the same position (i.e., the reticle position does not change) for a while since the depth value and the capture direction do not change.

Therefore, since the depth value of the capture point does not change even if the capture target has disappeared, the reticle can be smoothly moved to another target object positioned near the reticle without causing a rapid backward movement of the reticle.

Although an example in which the depth value of the capture point is not changed for a predetermined period has been described above, the depth value of the capture point may be changed to only a small extent for a predetermined period, and may be set to the deepest position in the capture direction after the predetermined period has elapsed.

Figure 14:
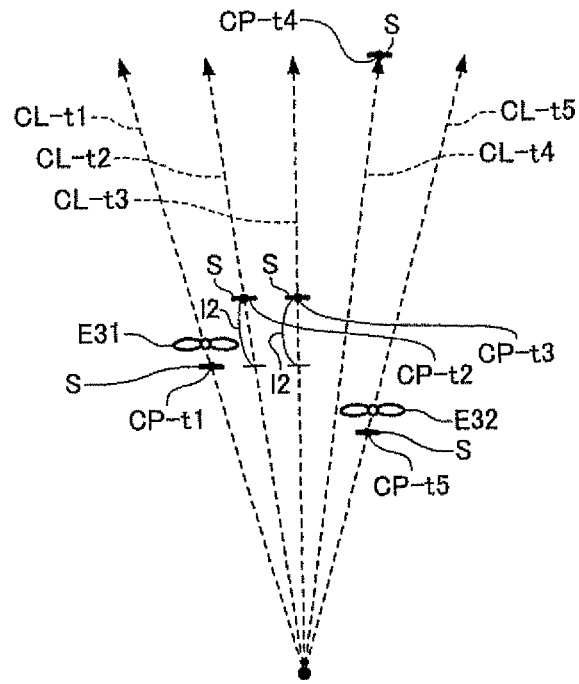
FIG. 14 illustrates another example of a normal control process when a capture target has been lost.

FIG. 14 illustrates an example of the control process that changes the depth value of the capture point to only a small extent for a predetermined period when the capture target has been lost, and changes the depth value of the capture point to the maximum setting value when the predetermined period has elapsed. The following description illustrates an example in which the capture target has been lost due to a change in the capture direction.

As illustrated in FIG. 14, the target object E31 (capture target) is present in the capture direction CL-t1 at the time t1, and no target object (capture target) is present in the capture direction CL-t2 at the time t2. In this case, the depth value of the capture point may be changed to only a small extent for a predetermined period, and may be set to the maximum setting value after the predetermined period (k2) has elapsed in order to avoid a rapid backward movement of the reticle.

For example, the depth value of the capture point may not be changed for k2 frames after a transition to a state in which the capture target is not present in the capture direction has occurred. When t3-t1<k2, the depth value of the capture point is changed to only a small extent (i.e., a position moved backward by a second change value 12) from the time t1 to the time t3. Therefore, the capture points CP-t2 and CP-t3 at the times t2 and t3 are disposed along the capture directions (capture line) CL-t2 and CL-t3 at a position z(t1)+12 (i.e., the depth value has changed by the change value 12 from the depth value z(t1) of the capture point CP-t0 at the time t1). When t4-t1>k2, the depth value of the capture point CP-t4 is changed to the maximum setting value at the time t4.

Since a transition from a state in which the capture target is not present in the capture direction to a state in which the capture target is present in the capture direction occurs at the time t5, the depth value of the capture point CP-t5 may be instantaneously changed to a position on the front side of the target object E32 (may be changed to the same position as that of the target object E32).

Therefore, since the depth value of the capture point does not change even if the capture target has been lost, the reticle can be smoothly moved to another target object positioned near the reticle without causing a rapid backward movement of the reticle.

Note that the predetermined periods k1 and k2 may be appropriately set. For example, the predetermined periods k1 and k2 (i.e., depth value setting condition (e.g., the time in which the depth value is not changed, or the change speed)) may be changed based on given conditions such as the type, size, and disposition state (number, density, and distribution) of the object in the virtual three-dimensional space, a predetermined parameter (e.g., the number of enemies, difficulty level, hit score, strength, and stage), or a change in operation input performed by the player (e.g., a rapid change in reticle position).

(7) Control Process that Changes Moving Speed of Capture Point in Depth Direction A control process that changes the moving speed of the capture point in the depth direction is described below as an example of a process that controls the depth value of the capture point when a transition has occurred from a state in which the capture target is present in the capture direction to a state in which the capture target is not present in the capture direction (i.e., when the capture target has been lost).

Figure 15:
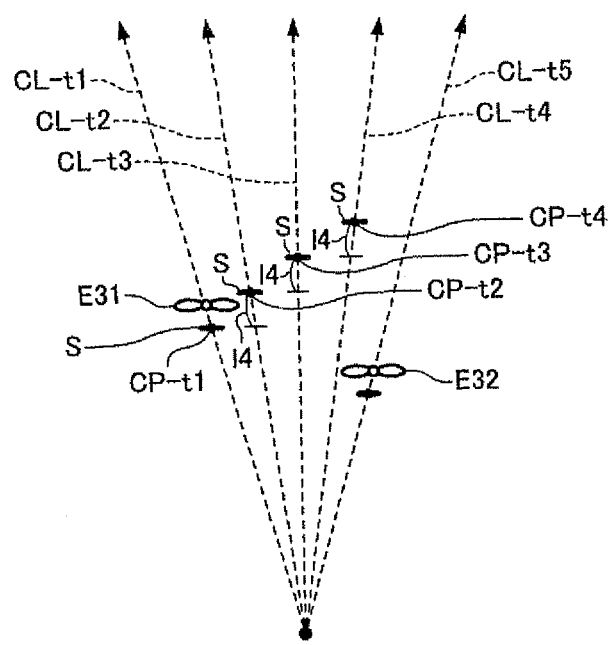
FIG. 15 illustrates an example of a control process that changes the speed when a capture target has been lost.

FIG. 15 illustrates an example of a control process that changes the speed when the capture target has been lost due to a change in the capture direction.

As illustrated in FIG. 15, the target object E31 (capture target) is present in the capture direction CL-t1 at the time t1, and no target object (capture target) is present in the capture direction CL-t2 at the time t2. In this case, the moving speed of the reticle in the depth direction may be changed in order to avoid a rapid backward movement of the reticle. The moving speed of the reticle in the depth direction may be changed by increasing the moving time of the reticle in the depth direction, or setting a change value 14 per frame to a value sufficiently smaller than the maximum setting value in the depth direction, for example.

When the change value 14 per frame is set, and the depth value is set to the deepest position when the capture target has been lost, for example, the depth value may be changed in the depth direction (i.e., the direction away from the virtual camera) by the change value 14 for predetermined frames instead of instantaneously changing the depth value to the deepest position within one frame.

Specifically, the depth value of the capture point may be changed in the depth direction by the change value 12 from the time t2 to the time t4 before the reticle aims at a new capture target. When the depth value of the capture point CP-t1 at the time t1 is referred to as z(t1), the depth value z(t2) of the capture point CP-t2 at the time t2 is z(t1)+12, the depth value z(t3) of the capture point CP-t3 at the time t3 is z(t2)+12, and the depth value z(t4) of the capture point CP-t4 at the time t4 is z(t3)+12. Since a transition from a state in which the capture target is not present in the capture direction to a state in which the capture target is present in the capture direction occurs at the time t5, the depth value of the capture point CP-t5 may be instantaneously changed to a position on the front side of the target object E32 (may be changed to the same position as that of the target object E32).

In this case, since the depth value of the capture point changes little by little, the player is given an impression that the moving speed of the reticle has decreased. Therefore, since the depth value of the capture point does not rapidly change even if the capture target has been lost, the reticle can be smoothly moved to another target object positioned near the reticle without causing a rapid backward movement of the reticle.

The above control process is also effective when the capture target has been lost due to the movement of the capture target, or when the capture target has been lost due to a change in the capture direction and the movement of the capture target.

A control process that sets the depth value of the capture point when the capture target has been lost so that the moving speed of the reticle in the depth direction increases with time is described below.

Figure 16:
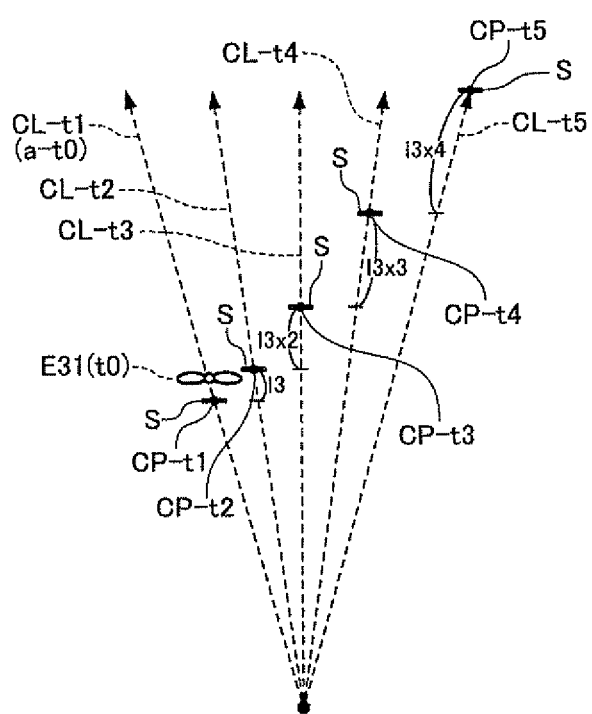
FIG. 16 illustrates another example of a control process that changes the speed when a capture target has been lost.

FIG. 16 illustrates an example of the control process that changes the speed (i.e., changes the moving speed with time) when the capture target has been lost due to a change in the capture direction.

As illustrated in FIG. 16, the target object E31 (capture target) is present in the capture direction CL-t1 at the time t1, and no target object (capture target) is present in the capture direction CL-t2 at the time t2. A state in which no target object (capture target) is present in the capture direction continues for a while. In this case, the moving speed of the reticle in the depth direction may be increased with time in order to avoid a rapid backward movement of the reticle.

For example, when a reference change value 13 per frame is set, and the depth value is set to the deepest position when the capture target has been lost, the depth value may be changed in the depth direction (i.e., the direction away from the virtual camera) by 13×n (where, n is the number of elapsed frames) for a plurality of frames instead of instantaneously changing the depth value to the deepest position within one frame.

When the depth value of the capture point CP-t1 at the time t1 is referred to as $z(t1)$, the depth value $z(t2)$ of the capture point CP-t2 at the time t2 is $z(t1)+13$, the depth value $z(t3)$ of the capture point CP-t3 at the time t3 is $z(t2)+13\times2$, the depth value $z(t4)$ of the capture point CP-t4 at the time t4 is $z(t3)+13\times3$, and the depth value $z(t5)$ of the capture point CP-t5 at the time t5 is $z(t4)+13\times4$.

Therefore, the player is given an impression that the change speed of the depth value of the capture point increases with time. Therefore, since the depth value of the capture point does not instantaneously change, but a change in the depth value of the capture point increases with time even if the capture target has been lost, a reticle image that is comfortable for the player can be provided.

(8) Process that Sets Object Group as Capture Target

Figure 17A:
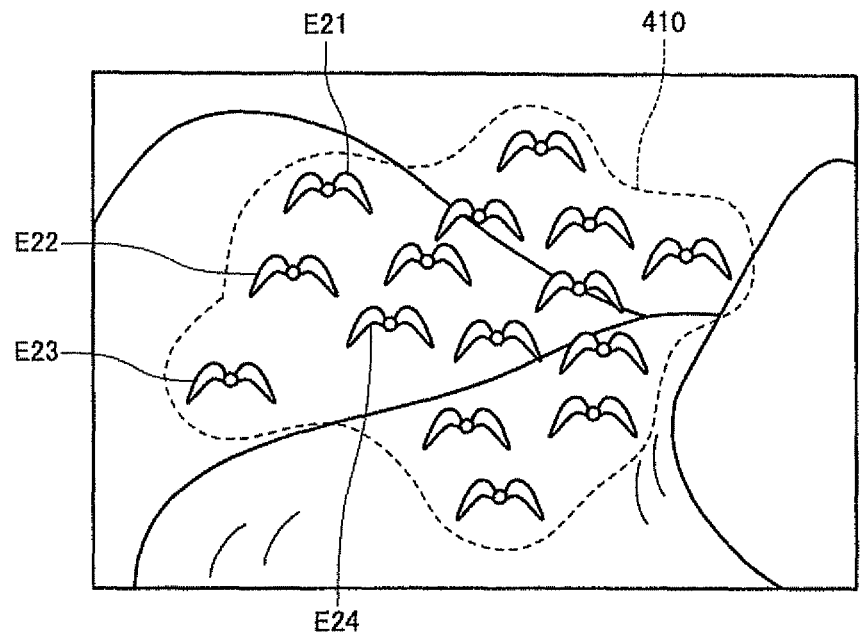
FIGS. 17A and 17B illustrate examples of a game image.
Figure 17B:

FIGS. 17A and 17B illustrate examples of a game image.

FIG. 17A illustrates an image in which a number of target objects move in the virtual three-dimensional space in a group, and FIG. 17B illustrates an image in which the target objects move individually. Since the player shoots the target objects one after another in a situation illustrated in FIG. 17A, the reticle image moves in the depth direction even if a number of target objects are present if the reticle moves backward in the virtual three-dimensional space each time the target object has disappeared (shot). Therefore, a game image inconvenient to the player is generated. In a situation illustrated in FIG. 17A, a game image convenient to the player can be generated by not moving the reticle position backward even if the target object positioned corresponding to the reticle has disappeared.

Therefore, a plurality of target objects E21, E22, E23, E24, . . . may be grouped into an object group 410, and the object group may be set as the capture target. In this case, when the object group is present in the capture direction, the depth value is set corresponding to the object group. Therefore, even if the target object E24 that belongs to the object group 410 has been shot and disappeared, for example, the depth value of the capture point is set to the depth value linked to the object group without being changed in the depth direction in the virtual three-dimensional space.

The depth value linked to the object group may be the average value of the depth values of the objects that belong to the object group, the depth value of one of the objects that belong to the object group that is positioned closest to the virtual camera, or the depth value of a representative object of the object group, for example.

The target objects may be grouped by a predetermined method. For example, when controlling the movement of a plurality of target objects as a group (e.g., group control process), the target objects may be grouped in a movement control unit.

The target objects that move individually may be grouped based on the position of each target object in each frame, and the target objects may be dynamically grouped corresponding to a change in the position of each target object.

Figure 22:
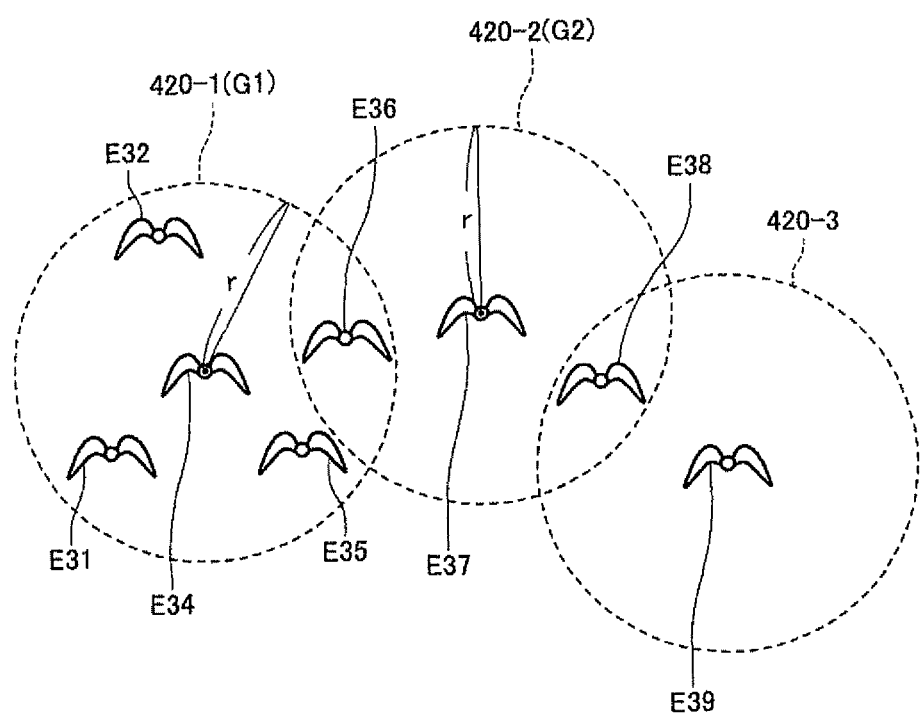
FIG. 22 illustrates an example in which target objects are dynamically grouped.

FIG. 22 illustrates an example in which the target objects are dynamically grouped.

As illustrated in FIG. 22, when target objects E31 to E39 are present in the virtual three-dimensional space, and the number of target objects present within a predetermined range (e.g., a sphere having a radius of r) from the given target object E34 is equal to or larger than a predetermined number, the target objects may be grouped. For example, when a group setting condition whereby the target objects are grouped when the number of target object present within a predetermined range is equal to or larger than two has been set, since the target objects E31, E32, E35, and E36 are present within a predetermined range 420-1 around the target object E34, the group setting condition is satisfied, and a group G1 including the target objects E31, E32, E34, E35, and E36 is formed. Since the target objects E36 and E38 are present within a predetermined range 420-2 around the target object E37, the group setting condition is satisfied, and a group G2 including the target objects E36, E37, and E38 is formed. Since only the target object E38 is present within a predetermined range 420-3 around the target object E39, the group setting condition is not satisfied (i.e., a group is not formed).

In FIG. 22, the target object 36 belongs to the groups G1 and G2. Specifically, a group may be formed so that one target object belongs to a plurality of groups.

The target objects may be grouped using the method that defines the group setting in advance and the method that dynamically changes the group setting in combination. For example, the target objects may be grouped in advance when the objects appear on the screen, and the group setting may be canceled when most of the target objects belonging to the group have been shot and disappeared (i.e., when the number of target objects has decreased). For example, when the target objects that have been grouped in advance (see FIG. 17A) have been shot so that the number of target objects has decreased (see FIG. 17B), whether or not to cancel the group setting may be determined based on a parameter (e.g., the number of objects and the positional dispersion), and the group setting may be canceled when it has been determined to cancel the group setting.

FIGS. 18A and 18B illustrate a capture determination process that is performed corresponding to each object group.

As illustrated in FIG. 18A, a hit check volume 420 may be set to an object group including the target objects E21, E22, E23, and E24, and whether or not the object group is the capture target may be determined by performing a hit check (intersection determination) on the hit check volume 420 and the capture direction (capture line) CL to specify the object group as the capture target.

The shape of the hit check volume 420 may be dynamically changed corresponding to the disposition state of the target objects E21, E22, E23, and E24 that form the object group in each frame. For example, a hit check volume that includes the target objects E21, E22, E23, and E24 that form the object group may be calculated in each frame based on the position information about each target object.

When the positional relationship between the target objects that form the object group does not change to a large extent, a hit check volume provided in advance may be used.

A hit check (intersection determination) on the hit check volume 420 and the capture direction (capture line) CL may be performed using a hit check volume HB2 (see FIG. 21) that is set corresponding to the capture direction (capture line) CL instead of the capture direction (capture line) CL.

As illustrated in FIG. 18B, a hit check plane (plate) 430 (may be a two-dimensional area) may be set to an object group including the target objects E21, E22, E23, and E24, and whether or not the object group is the capture target may be determined by performing a hit check (intersection determination) on the hit check plane 430 and the capture direction (capture line) CL to specify the object group as the capture target. The hit check plane 430 may be set so that a normal 423 coincides with the line-of-sight direction.

Figure 23:
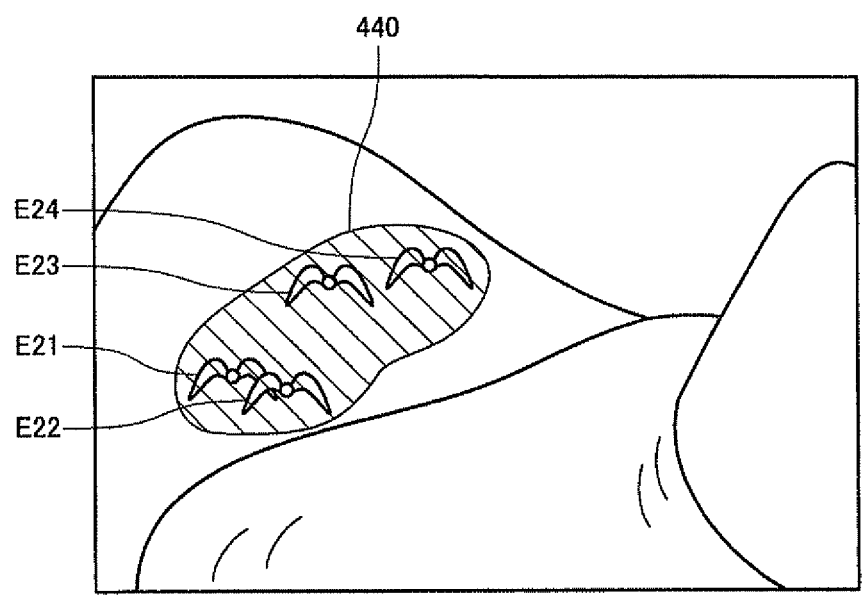
FIG. 23 illustrates a state in which target objects E21, E22, E23, and E24 are projected onto a screen.

The shape of the hit check plane 430 may be dynamically changed corresponding to the disposition state of the target objects E21, E22, E23, and E24 that form the object group in each frame. As illustrated in FIG. 23, the target objects E21, E22, E23, and E24 may be projected onto the screen, a two-dimensional area 440 including the target objects E21, E22, E23, and E24 may be calculated, and a hit check plane having the shape of the two-dimensional area 440 may be calculated, for example.

When the positional relationship between the target objects that form the object group does not change to a large extent, a hit check plane provided in advance may be used.

A hit check (intersection determination) on the hit check plane 430 and the capture direction (capture line) CL may be performed using the hit check volume HB2 (see FIG. 21) that is set corresponding to the capture direction (capture line) CL instead of the capture direction (capture line) CL.

(9) Capture Target Determination Process by Predicting Change in Capture Direction An example of a process that predicts a change in the capture direction based on the change history of the capture direction, and specifies the capture target taking account of the predicted change in the capture direction is described below.

Figure 19A:
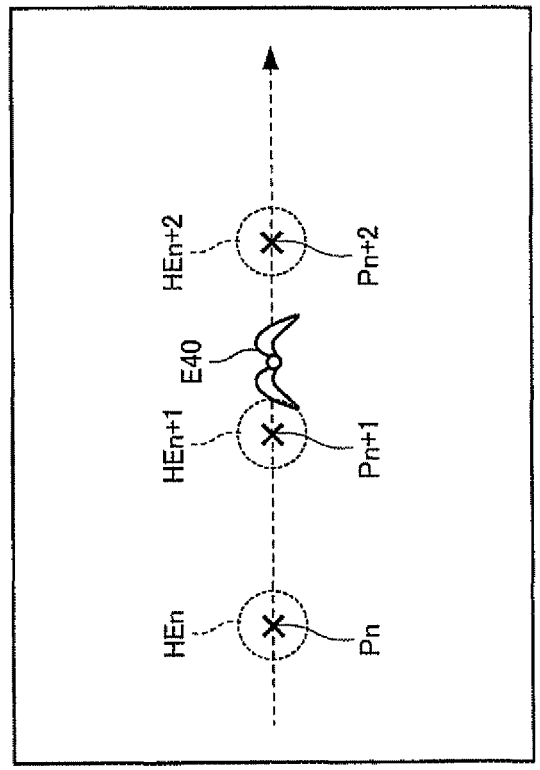
FIGS. 19A and 19B illustrate a capture point change prediction process.
Figure 19B:
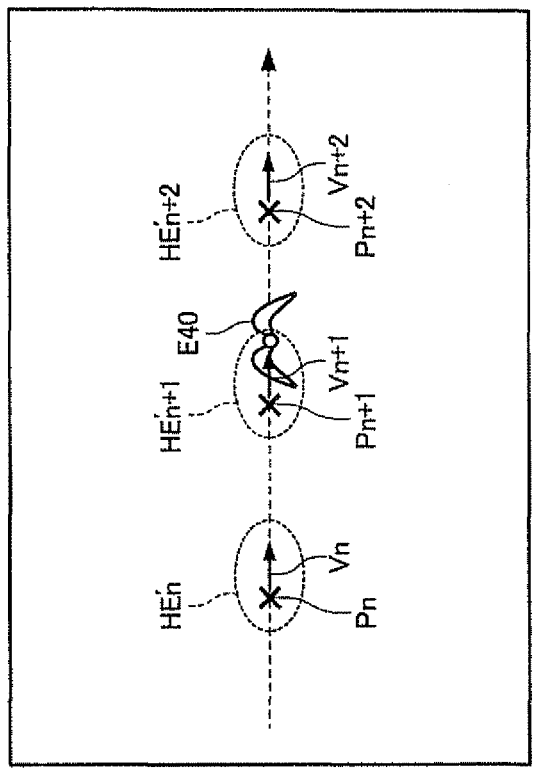

FIGS. 19A and 19B illustrate a capture point change prediction process.

FIG. 19A illustrates an example in which the capture target is determined without predicting a change in the capture direction. Note that reference symbols $P_n$, $P_{n+1}$, and $P_{n+2}$ indicate the indication positions within a screen 460 at times t1, t2, and t3, respectively.

In this case, when a target object that is drawn within a predetermined area $HE_n$ around the indication position $P_n$ is present at the time t1, the target object can be set as the capture target. When a target object that is drawn within a predetermined area $HE_{n+1}$ around the indication position $P_{n+1}$ is present at the time t2, the target object can be set as the capture target. When a target object that is drawn within a predetermined area $HE_{n+2}$ around the indication position $P_{n+2}$ is present at the time t3, the target object can be set as the capture target. In FIG. 19A, a target object that satisfies the above condition is not present.

FIG. 19A illustrates an example in which a change in the capture direction is predicted, and the capture target is determined taking account of the predicted change in the capture direction. Note that reference symbols $P_n$, $P_{n+1}$, and $P_{n+2}$ indicate the indication positions within a screen 460 at times t1, t2, and t3, respectively. For example, when determining the capture target taking account of an estimated moving vector v in the current frame based on the movement history of the indication position in the previous frame, estimated moving vectors $v_n$, $v_{n+1}$, and $v_{n+2}$ in the current frame are calculated based on the movement history of the indication position in the previous frame. The estimated moving vectors $v_n$, $v_{n+1}$, and $v_{n+2}$ may be calculated based on the actual movement history corresponding to a predetermined number of previous frames, for example.

The velocity vector corresponding to a predetermined period may be calculated based on the movement results within a predetermined period immediately before the time t1, and determined to be the estimated moving vector $v_n$ at the time t1. Likewise, the velocity vectors may be calculated based on the movement results within a predetermined period immediately before the times t2 and t3, and determined to be the estimated moving vectors $v_{n+1}$ and $v_{n+2}$ at the times t2 and t3.

A determination area $HE'_n$ obtained by deforming a predetermined area HE around the indication position $P_n$ corresponding to the estimated moving vector $v_n$ may be set at the time t1, and a target object present within the determination area $HE'_n$ may be set as the capture target. A determination area $HE'_{n+1}$ obtained by deforming a predetermined area $HE_{n+1}$ around the indication position $P_{n+1}$ corresponding to the estimated moving vector $v_{n+1}$ may be set at the time t2, and a target object present within the determination area $HE'_{n+1}$ may be set as the capture target. A determination area $HE'_{n+2}$ obtained by deforming a predetermined area $HE_{n+2}$ around the indication position $P_{n+2}$ corresponding to the estimated moving vector $v_{n+2}$ may be set at the time t3, and a target object present within the determination area $HE'_{n+2}$ may be set as the capture target.

An area obtained by enlarging the predetermined area $HE_n$ (see FIG. 19A) in the direction of the estimated moving vector $v_n$ may be set as the determination area $HE'_n$.

In this case, when a target object E40 is present in the forward direction of the capture direction even if a target object is not present in the capture direction, the target object E40 is set as the capture target. Therefore, a situation in which the reticle moves backward can be reduced, so that a reticle image that can be easily observed can be provided.

FIGS. 20A and 20B three-dimensionally illustrate the situation in FIGS. 19A and 19B within the virtual three-dimensional space.

FIG. 20A illustrates an example in which the capture target is determined without predicting a change in the capture direction. Reference symbol S' indicates a virtual screen that is set within the virtual three-dimensional space corresponding to the display 460 (see FIG. 19A). Reference symbols $P'_n$, $P'_{n+1}$, and $P'_{n+2}$ indicate points on the virtual screen corresponding to the indication positions $P_n$, $P_{n+1}$, and $P_{n+2}$ (see FIG. 19A).

A hit-check determination space HB-t1 (e.g., a columnar space (centerline: CL-t1), a hit-check determination space HB-t2 (e.g., a columnar space (centerline: CL-t2), and a hit-check determination space HB-t3 (e.g., a columnar space (centerline: CL-t3) may be set corresponding to the capture directions (capture lines) CL-t1, CL-t2, and CL-t3 at the times t1, t2, and t3 within the virtual three-dimensional space. The presence or absence of the capture target may be detected, or the capture target may be specified by performing a hit check on the determination space and the target object (or a hit check volume set to the target object). In FIG. 19B, a capture target is not present at the times t1, t2, and t3.

Note that the determination space is not limited to a columnar space, but may have a conical shape having a vertex at the position of a muzzle or the like. The determination space may have another shape. For example, a columnar determination space is suitable when using a bazooka as the weapon, and a conical determination space is suitable when using a shotgun as the weapon. The determination space may be changed when the weapon has been changed during the game, for example.

FIG. 20A illustrates an example in which a change in the capture direction is predicted, and the capture target is determined taking account of the predicted change in the capture direction. Reference symbol S' indicates a virtual screen that is set within the virtual three-dimensional space corresponding to the display 460 (see FIG. 19B). Reference symbols $P'_n$, $P'_{n+1}$, and $P'_{n+2}$ indicate points on the virtual screen corresponding to the indication positions $P_n$, $P_{n+1}$, and $P_{n+2}$ (see FIG. 19B).

The hit-check determination spaces HB-t1, HB-t2, and HB-t3 determined taking account of the predicted change in the capture direction are set corresponding to the capture directions (capture lines) CL-t1, CL-t2, and CL-t3 at the times t1, t2, and t3 within the virtual three-dimensional space. The determination spaces may be obtained by deforming the determination spaces HB-t1, HB-t2, and HB-t3 (see FIG. 20A) based on the estimated moving vectors $v_n$, $v_{n+1}$, and $v_{n+2}$ (see FIG. 19B). For example, the determination spaces may be obtained by enlarging the determination spaces HB-t1, HB-t2, and HB-t3 in the direction of the estimated moving vectors $v_n$, $v_{n+1}$, and $v_{n+2}$ at the times t1, t2, and t3.

3. Process

Figure 24:
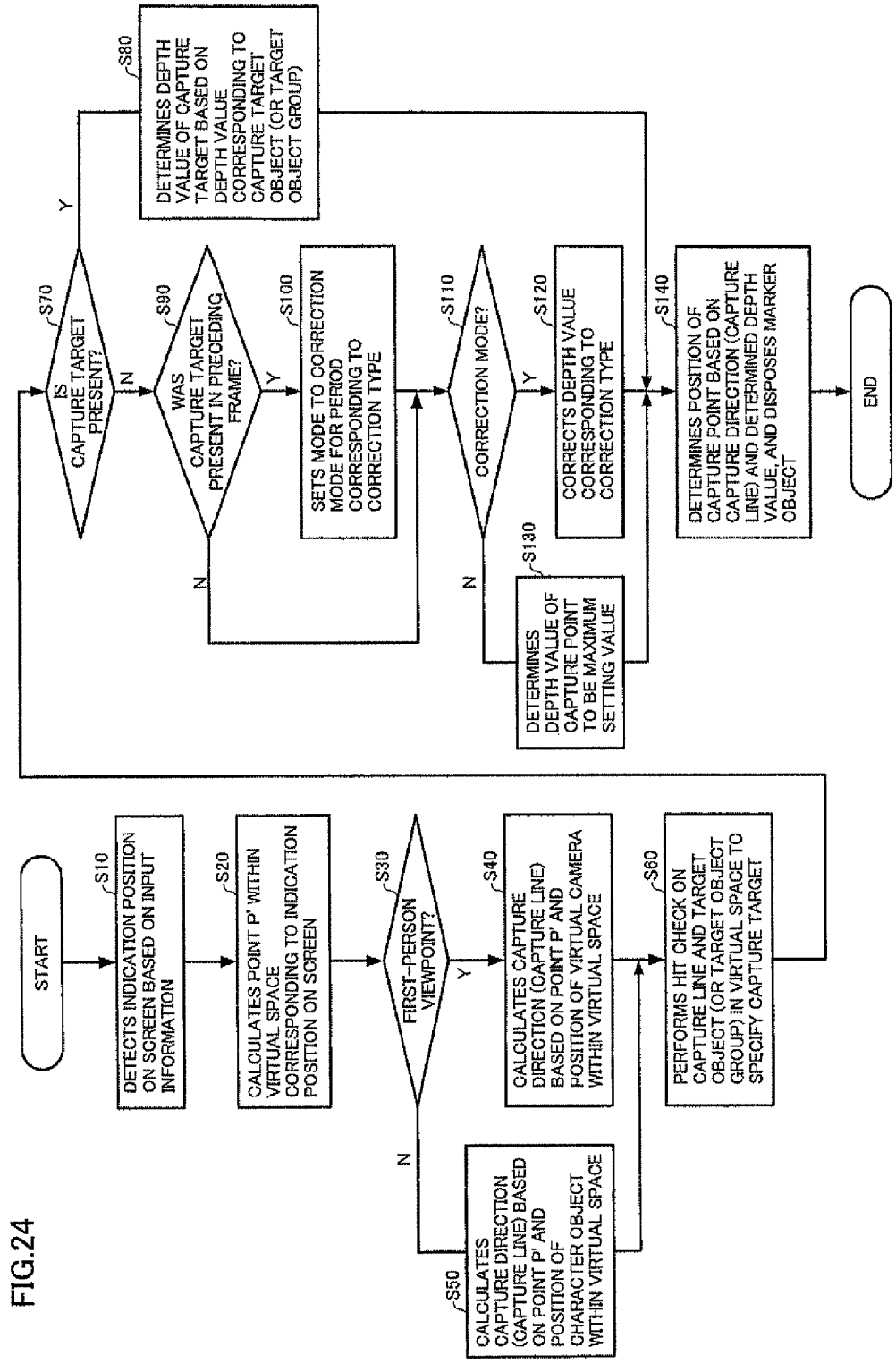
FIG. 24 is a flowchart illustrating the flow of a reticle position correction process according to one embodiment of the invention.

FIG. 24 is a flowchart illustrating the flow of the reticle position correction process according to one embodiment of the invention.

The following process may be performed every frame to calculate the position of the capture point, and the reticle object may be disposed at the capture point.

The indication position P on the screen is detected based on the input information (step S10). For example, the indication position P on the screen may be calculated by the process described with reference to FIGS. 9A to 9C. The point P' within the virtual space corresponding to the indication position P on the screen is calculated (step S20).

When using a first-person viewpoint (YES in step S30), the capture direction (capture line) is calculated based on the point P' and the position of the virtual camera within the virtual space. When using a third-person viewpoint (NO in step S30), the capture direction (capture line) is calculated based on the point P' and the position of the character object within the virtual space (step S50).

A hit check is performed on the capture line and the target object (or target object group) in the virtual space to specify the capture target (step S60). When the capture target is present (YES in step S70), the depth value of the capture target is determined based on the depth value corresponding to the capture target object (or target object group) (step S80). When using a presence flag in order to determine whether or not the preceding capture target is present during the subsequent process, the presence flag may be set to ON when the process in the current frame has ended.

When the capture target is not present (NO in step S70), whether or not the capture target was present in the preceding frame is determined (step S90). Whether or not the capture target was present in the preceding frame may be determined based on the presence flag set in the preceding frame.

When the capture target was present in the preceding frame (YES in step S90) (i.e., the capture target has been lost in the current frame), the mode is set to the correction mode for a correction period corresponding to the correction (correction type) performed on the depth value (step S100). For example, a timer may be set, and the correction mode may be terminated, and the normal mode may be started when the timer value has become 0. This is advantageous when correcting the depth value over a plurality of frames (e.g., when the depth value is not changed for a predetermined period, or is changed little by little over a predetermined period). For example, when the depth value is not changed for the predetermined period k1 (see FIG. 11), the predetermined period k1 may be set using a timer.

When the mode is the correction mode (YES in step S110), the depth value is corrected corresponding to the correction type (step S120). For example, when the depth value is not changed for a predetermined period, the depth value is corrected using the depth value in the preceding frame. When the depth value is changed little by little, the depth value is corrected by adding a predetermined correction value to the depth value in the preceding frame (see FIG. 15).

When the mode is not the correction mode (NO in step S110), the depth value of the capture point is determined to be the maximum setting value (step S130).

The position of the capture point is then determined based on the capture direction (capture line) and the determined depth value, and the marker object is disposed at the capture point (step S140).

Note that the invention is not limited to the above embodiments. Various modifications and variations may be made. For example, any term cited with a different term having a broader meaning or the same meaning at least once in the specification and the drawings may be replaced by the different term in any place in the specification and the drawings.

The above embodiments have been described taking the position of the camera control data as an example. Note that the invention is not limited thereto. The above control process may be similarly performed using the rotation or the angle of view.

The above embodiments have been described taking an example in which the image is generated as a normal two-dimensional image. Note that the image of the virtual three-dimensional space may be a three-dimensional (stereoscopic) image.

For example, when generating a binocular stereoscopic image, a process that generates a first image (right-eye image) of the virtual three-dimensional space including the marker viewed from a first virtual camera (right-eye virtual camera), and a process that generates a second image (left-eye image) of the virtual three-dimensional space including the marker viewed from a second virtual camera (left-eye virtual camera) may be performed, and a stereoscopic image may be generated based on the first image (right-eye image) and the second image (left-eye image).

The capture target present in the capture direction may be detected using a direction that connects the capture point and the virtual camera set at a position suitable for observing a stereoscopic image as the capture direction (capture line).

For example, when generating a binocular stereoscopic image, the capture target specifying section may detect the capture target present in the capture direction (capture line) using a direction that connects the capture point and a third virtual camera (center camera) disposed at the midpoint between the first virtual camera (left-eye camera) and the second virtual camera (right-eye camera).

A case where the capture point is set at a forward position, and the position of the capture point is clamped to the initial value when the initial value is exceeded is also included within the scope of the invention.

For example, a case where the depth value is set based on a function for controlling a change in the depth value (e.g., function z=f(t) that calculates the depth (Z) value using time t as a variable), and a case where the output value of the function is filtered are also included within the scope (correction of the depth value) of the invention.

Figure 25:
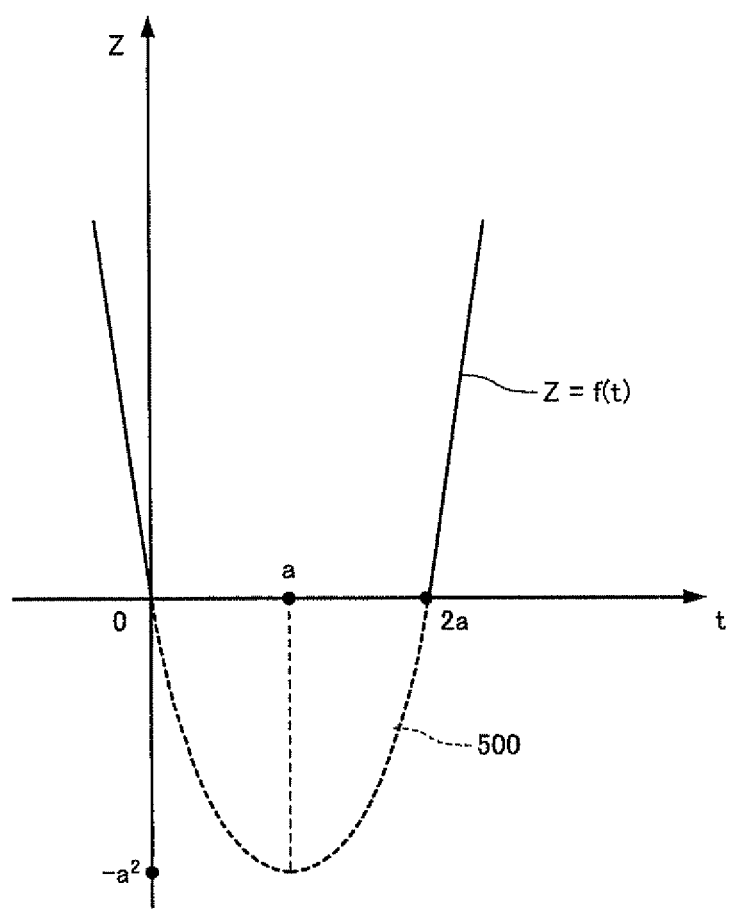
FIG. 25 illustrates another example of a control process when a capture target has been lost.

As illustrated in FIG. 25, a function that calculates the depth value z at the time t is given by a quadratic function shown by $z=(t-a)^2-a^2$, for example, a parabola in which Z=0 when t=0 and $Z=-a^2$ (minimum value) when t=a is obtained. In this case, if a filtering process is performed so that Z=0 (initial value) when t=0 and the Z-value is clamped to the initial value when Z<0, the Z-value is fixed at 0 in a period from t=0 to t=2a when the Z-value forms a broken line 500. In this case, an effect similar to that obtained when setting a predetermined period, and setting the Z-value to the initial value in the predetermined period (e.g., a control process that does not change the depth value for a predetermined period (see FIG. 13) can be obtained. Such a case is also included within the scope (correction of the depth value) of the invention.

Note that a function other than a quadratic function may also be used.

The invention may be applied to various game systems such as an arcade game system, a consumer game system, a portable game system, and a system board that generates a game image.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium storing a program, which when executed by at least one processor, causes the at least one processor to generate an image of a virtual three-dimensional space, the program causing a computer to function as:

a virtual three-dimensional space setting section that disposes an object in the virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point within the virtual three-dimensional space; and an image generation section that generates an image of the virtual three-dimensional space viewed from a virtual camera, objects including the marker being disposed in the virtual three-dimensional space, the capture target specifying section determining whether or not the capture target is present in the capture direction within the virtual three-dimensional space, and specifying the capture target when the capture target is present, and the marker placement control section determining the depth value of the capture point based on a depth value corresponding to the capture target when the capture target is present, setting a depth value of a drawn object that is positioned furthest from the virtual camera in the capture direction, or a predetermined depth value, as the depth value of the capture point when the capture target is not present, and performing a depth value correction process that corrects the depth value of the capture point when a transition has occurred from a state in which the capture target is present to a state in which the capture target is not present.

2. The information storage medium as defined in claim 1, wherein the marker placement control section performs at least one of a process that does not change the depth value of the capture point for a predetermined period, a process that limits an amount of change in the depth value of the capture point, and a process that corrects the depth value of the capture point so that the depth value of the capture point does not instantaneously change to the depth value of the drawn object that is positioned furthest from the virtual camera, or the predetermined depth value, as the depth value correction process.

3. The information storage medium as defined in claim 1, wherein the marker placement control section sets the depth value of the capture point so that a moving speed of the marker disposed at the capture point increases with time when a transition has occurred from a state in which the capture target is present to a state in which the capture target is not present.

4. The information storage medium as defined in claim 1, wherein the marker placement control section changes a depth value setting condition based on a type, size, or disposition state of the objects disposed within the virtual three-dimensional space, a predetermined parameter, or a given condition.

5. The information storage medium as defined in claim 1, wherein the capture target specifying section predicts a change in the capture direction based on a change history of the capture direction, and specifies the capture target taking account of the predicted change in the capture direction.

6. A non-transitory computer-readable information storage medium storing a program, which when executed by at least one processor, causes the at least one processor to generate an image of a virtual three-dimensional space, the program causing a computer to function as:

a virtual three-dimensional space setting section that disposes an object in a virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point within the virtual three-dimensional space; and an image generation section that generates an image of the virtual three-dimensional space viewed from a virtual camera, objects including the marker being disposed in the virtual three-dimensional space, the capture target specifying section predicting a change in the capture direction based on a change history of the capture direction, and specifying the capture target taking account of the predicted change in the capture direction, and the marker placement control section determining the depth value of the capture point based on a depth value corresponding to the capture target when the capture target is present, and disposing the marker at a position in the capture direction corresponding to the determined depth value.

7. The information storage medium as defined in claim 1, wherein the capture target specifying section detects an object present in the capture direction as a capture target detection process; and wherein the marker placement control section determines the depth value of the capture point based on a depth value corresponding to a capture target object when the capture target object has been detected.

8. The information storage medium as defined in claim 6, wherein the capture target specifying section detects an object present in the capture direction as a capture target detection process; and wherein the marker placement control section determines the depth value of the capture point based on a depth value corresponding to a capture target object when the capture target object has been detected.

9. The information storage medium as defined in claim 1, wherein the capture target specifying section groups a plurality of objects, and detects an object group present in the capture direction as a capture target detection process; and wherein the marker placement control section determines the depth value of the capture point based on a depth value corresponding to a capture target object group when the capture target object group has been detected.

10. The information storage medium as defined in claim 6, wherein the capture target specifying section groups a plurality of objects, and detects an object group present in the capture direction as a capture target detection process; and wherein the marker placement control section determines the depth value of the capture point based on a depth value corresponding to a capture target object group when the capture target object group has been detected.

11. A non-transitory computer-readable information storage medium storing a program, which when executed by at least one processor, causes the at least one processor to generate an image of a virtual three-dimensional space, the program causing a computer to function as:

a virtual three-dimensional space setting section that disposes an object in a virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point within the virtual three-dimensional space; and an image generation section that generates an image of the virtual three-dimensional space viewed from a virtual camera, objects including the marker being disposed in the virtual three-dimensional space, the capture target specifying section grouping a plurality of objects, and detecting an object group present in the capture direction as a capture target detection process, and the marker placement control section determining the depth value of the capture point based on a depth value corresponding to a capture target object group when the capture target object group has been detected.

12. The information storage medium as defined in claim 1, wherein the capture target specifying section sets a first hit check plane or a first hit check volume to an object or an object group disposed within the virtual three-dimensional space, performs a hit check based on the first hit check plane or the first hit check volume and the capture direction, and determines a capture target object based on a hit check result.

13. The information storage medium as defined in claim 6, wherein the capture target specifying section sets a first hit check plane or a first hit check volume to an object or an object group disposed within the virtual three-dimensional space, performs a hit check based on the first hit check plane or the first hit check volume and the capture direction, and determines a capture target object based on a hit check result.

14. The information storage medium as defined in claim 11, wherein the capture target specifying section sets a first hit check plane or a first hit check volume to an object or an object group disposed within the virtual three-dimensional space, performs a hit check based on the first hit check plane or the first hit check volume and the capture direction, and determines a capture target object based on a hit check result.

15. The information storage medium as defined in claim 1, wherein the capture target specifying section detects the capture target present in the capture direction by using a direction that connects the capture point and the virtual camera positioned in part of a controller as the capture direction.

16. The information storage medium as defined in claim 6, wherein the capture target specifying section detects the capture target present in the capture direction by using a direction that connects the capture point and the virtual camera positioned in part of a controller as the capture direction.

17. The information storage medium as defined in claim 11, wherein the capture target specifying section detects the capture target present in the capture direction by using a direction that connects the capture point and the virtual camera positioned in part of a controller as the capture direction.

18. The information storage medium as defined in claim 1, wherein the image of the virtual three-dimensional space is a stereoscopic image; and wherein the capture target specifying section detects the capture target present in the capture direction by using a direction that connects the capture point and the virtual camera set at a position suitable for observing the stereoscopic image as the capture direction.

19. The information storage medium as defined in claim 6, wherein the image of the virtual three-dimensional space is a stereoscopic image; and wherein the capture target specifying section detects the capture target present in the capture direction by using a direction that connects the capture point and the virtual camera set at a position suitable for observing the stereoscopic image as the capture direction.

20. The information storage medium as defined in claim 11, wherein the image of the virtual three-dimensional space is a stereoscopic image; and wherein the capture target specifying section detects the capture target present in the capture direction by using a direction that connects the capture point and the virtual camera set at a position suitable for observing the stereoscopic image as the capture direction.

21. The information storage medium as defined in claim 1, wherein the image of the virtual three-dimensional space is a stereoscopic image:

wherein the image generation section performs a process that generates a first image of the virtual three-dimensional space including the marker viewed from a first virtual camera, and a process that generates a second image of the virtual three-dimensional space including the marker viewed from a second virtual camera, and generates a stereoscopic image based on the first image and the second image; and wherein the capture target specifying section detects the capture target present in the capture direction by using a direction that connects the capture point and a third virtual camera disposed at a midpoint between the first virtual camera and the second virtual camera as the capture direction.

22. The information storage medium as defined in claim 6, wherein the image of the virtual three-dimensional space is a stereoscopic image;

wherein the image generation section performs a process that generates a first image of the virtual three-dimensional space including the marker viewed from a first virtual camera, and a process that generates a second image of the virtual three-dimensional space including the marker viewed from a second virtual camera, and generates a stereoscopic image based on the first image and the second image; and wherein the capture target specifying section detects the capture target present in the capture direction by using a direction that connects the capture point and a third virtual camera disposed at a midpoint between the first virtual camera and the second virtual camera as the capture direction.

23. The information storage medium as defined in claim 11, wherein the image of the virtual three-dimensional space is a stereoscopic image;

wherein the image generation section performs a process that generates a first image of the virtual three-dimensional space including the marker viewed from a first virtual camera, and a process that generates a second image of the virtual three-dimensional space including the marker viewed from a second virtual camera, and generates a stereoscopic image based on the first image and the second image; and wherein the capture target specifying section detects the capture target present in the capture direction by using a direction that connects the capture point and a third virtual camera disposed at a midpoint between the first virtual camera and the second virtual camera as the capture direction.

24. An image generation device that generates an image of a virtual three-dimensional space, the image generation device comprising:

a virtual three-dimensional space setting section that disposes an object in a virtual three-dimensional space;

a capture direction specifying section that specifies a capture direction based on input information, a capture point being disposed in the capture direction within the virtual three-dimensional space;

a capture target specifying section that specifies a capture target within the virtual three-dimensional space based on the capture direction;

a marker placement control section that sets a depth value of the capture point based on a capture target specifying result, and disposes a marker at the capture point within the virtual three-dimensional space; and an image generation section that generates an image of the virtual three-dimensional space viewed from a virtual camera, objects including the marker being disposed in the virtual three-dimensional space, the capture target specifying section determining whether or not the capture target is present in the capture direction within the virtual three-dimensional space, and specifying the capture target when the capture target is present, and the marker placement control section determining the depth value of the capture point based on a depth value corresponding to the capture target when the capture target is present, setting a depth value of a drawn object that is positioned furthest from the virtual camera in the capture direction, or a predetermined depth value, as the depth value of the capture point when the capture target is not present, and performing a depth value correction process that corrects the depth value of the capture point when a transition has occurred from a state in which the capture target is present to a state in which the capture target is not present.

* * * * *